United States Patent [19]
Taguchi et al.

[11] Patent Number: 5,539,487
[45] Date of Patent: Jul. 23, 1996

[54] METHOD AND APPARATUS FOR RECORDING STEREOSCOPIC IMAGES AND LENTICULAR RECORDING MATERIAL USED THEREFOR

[75] Inventors: Seiichi Taguchi, Kanagawa; Shunkichi Igarashi, Tokyo, both of Japan

[73] Assignee: Fuji Photo Film Co., Ltd., Kanagawa, Japan

[21] Appl. No.: 24,761

[22] Filed: Mar. 2, 1993

[30] Foreign Application Priority Data

Mar. 2, 1992 [JP] Japan .................... 4-044876

[51] Int. Cl.⁶ .................................. G03B 35/08
[52] U.S. Cl. .................. 354/115; 352/53; 352/58; 352/81; 355/22; 355/33; 354/101
[58] Field of Search .............. 355/22, 33, 34; 354/101, 102, 115; 352/43, 52, 53, 58, 81, 100

[56] References Cited

U.S. PATENT DOCUMENTS

| | | | |
|---|---|---|---|
| 3,409,351 | 11/1968 | Winnek | 352/58 |
| 3,671,122 | 6/1972 | Dudley | 355/22 |
| 3,960,563 | 6/1976 | Lo et al. | |
| 4,037,950 | 7/1977 | Lo et al. | |
| 4,063,265 | 12/1977 | Lo et al. | |
| 4,120,562 | 10/1978 | Lo et al. | |
| 4,959,641 | 9/1990 | Bass et al. | 354/101 |

FOREIGN PATENT DOCUMENTS

| | | |
|---|---|---|
| 0058103 | 8/1982 | European Pat. Off. |
| 63-19649 | 11/1989 | Japan . |
| 2236400 | 4/1991 | United Kingdom . |

*Primary Examiner*—Monroe H. Hayes
*Attorney, Agent, or Firm*—Sughrue, Mion, Zinn, Macpeak & Seas

[57] ABSTRACT

The improved method and apparatus for recording a stereoscopic image read a plurality of original images photoelectrically, split each original image into linear images of a desired pitch, perform any necessary image processing operations such as arranging the linear images in the recording order, and record the linear images by scan exposure on a lenticular light-sensitive material having a lenticular sheet and a recording layer. The method and apparatus permit the lenticular light-sensitive material to be scan exposed from the rear side and they also enable the linear images to be recorded with increased line width and a stereoscopic image to be formed with satisfactory registration between the principal objects of the original images. The improved lenticular light-sensitive material has an anti-halation layer provided between the lenticular sheet and the recording layer, thus permitting scan exposure to be effected from the rear side. According to the present invention, stereoscopic images of high quality that have no perceivable unnaturalness such as flickers can be recorded with great ease and at any desired magnification.

14 Claims, 19 Drawing Sheets

METHOD AND APPARATUS FOR RECORDING STEREOSCOPIC IMAGES AND LENTICULAR RECORDING MATERIAL USED THEREFOR

BACKGROUND OF THE INVENTION

This invention relates to a method and apparatus that rely upon scanning exposure to record stereoscopic images on a lenticular recording material having a lenticular sheet and a recording layer. The invention also relates to a lenticular recording sheet suitable for use in implementing that method and apparatus.

More particularly, the invention relates to a method and apparatus that have the following features: they permit stereoscopic images to be recorded on a lenticular recording material having a recording layer provided as an integral part of the back side of a lenticular sheet; they provide ease in performing various image processing operations such as enlargement and reduction while, at the same time, they have great flexibility in adaptation for alterations in the specifications of the lenticular sheet, thereby enabling stereoscopic images of high quality to be produced through simple steps; they are capable of adjusting the width of linear images to be recorded within one pitch of lenticular lenses on the lenticular sheet, thereby enabling the recording of stereoscopic images of high quality that can yield satisfactory stereoscopic vision; and they are capable of achieving registration between the principal subjects of original images so as to record stereoscopic images of high quality.

The invention also relates to a lenticular recording material that is suitable for use in implementing that method and apparatus for recording stereoscopic images.

A typical method of recording stereoscopic images using a lenticular sheet is shown in FIG. 24. The lenticular sheet indicated by C has a recording layer D on the back side to construct a lenticular recording material F. Original images $A_1$ and $A_2$ coming from different viewpoints (one from the right and the other from the left are projected onto projection lenses $B_1$ and $B_2$; the projected original images are then separated into linear images by means of the lenticular sheet C and recorded as $E_l$, $E_2$, etc.

As shown in FIG. 25, the images $E_1$ and $E_2$ recorded on the recording layer D are viewed through the lenticular sheet C of the lenticular recording material F by means of the right and left eyes R and L. This twin-lens system provides a stereoscopic vision of the original images $A_1$ and $A_2$.

Conventionally, the recording of linear images on a lenticular recording material has been accomplished with a stereoscopic image recording apparatus (hereunder referred to simply as "a recording apparatus") that relies upon optical exposure (printing). With this recording apparatus, original images which are transmission images are projected from a light source such as a halogen lamp and, as shown in FIG. 24, the light transmitted through the original images passes through the projection lenses to be focused on the lenticular recording material via the lenticular sheet, whereby the original images are exposed as linear images. Japanese Patent Publication (kokoku) Nos. 5473/1967, 6488/1973, 607/1974 and 33847/1978 disclose recording apparatuses with which two original images are projected for printing on a lenticular recording material.

It is also known that stereoscopic images of high quality can be produced by increasing the number of original images. On the basis of this concept, Japanese Patent Publication (kokoku) No. 7981/1983 proposed a recording apparatus with which a number of original images are exposed sequentially on a lenticular recording material, and Japanese Patent Publication (kokoku) No. 31578/1981 proposed a recording apparatus, in which a number of original images are projected en masse onto a field lens and are then passed through projection lenses that are associated with the respective original images, whereby those original images are recorded on a lenticular recording material at the corresponding print angles.

Japanese Patent Application (kokai) No. 185438/1991 discloses a method that uses a reciprocating shutter the speed of which is varied subtlety during its movement, thereby attempting to correct the problem of uneven exposure which may occur on account of the vignetting of projection and lenticular lenses that develops unavoidably when stereoscopic images are to be recorded by exposure (printing) through the lenticular lenses.

With the aforementioned apparatus for recording stereoscopic images by an optical method, it is necessary to expose a plurality of original images by projecting them onto a lenticular recording material and, hence, the optics for projecting the original images onto the lenticular recording material will unavoidably become complex in construction and, in addition, it has only a low degree of freedom in design. In particular, as the number of original images increases with a view to improving the image quality, the optics becomes progressively complex and bulky. Furthermore, the demand for providing greater flexibility in adaptation to changes in the recording conditions such as alterations in magnification (enlargement and reduction of the size of image to be recorded) will adds to the complexity of the optics and, in a certain case, the efforts for adaptation are subject to optical or mechanical limitations.

If the viewing distance is changed, it becomes necessary to alter the specifications for the lenticular sheet used, such as the pitch of lenticular lenses formed on the sheet. However, effecting such alterations is not easy since it is also necessary to make optical and mechanical alterations in the projecting and exposing conditions (system layout) such as the projecting and exposing (printing) angle. Similarly, it is also difficult to meet the requirement for changing the size of image to be recorded.

As a further problem, the original images are recorded (printed) on the recording layer with the exposing light passing through the lenticular sheet (or lenticular lenses formed on it) and, hence, none of the methods available today for effecting optical correction are capable of avoiding the occurrence of unwanted phenomena such as uneven exposure due to the vignetting of the lenticular sheet and this will eventually deteriorate the recorded images.

In short, the conventional apparatus for recording stereoscopic images by optical exposure (projection and exposure) have been so complex in construction that it is not easy to operate and is incapable of highly efficient recording of stereoscopic images that have high degree of freedom and high image quality.

In contrast, image recording by scanning exposure requires comparatively simple optics and yet it has great flexibility in adaptation for various image processing operations including changes in the magnification of image to be recorded and sharpness correction, and alterations in the size of image to be recorded and in the specifications of the lenticular sheet. To take advantage of these features, various apparatus and methods have been proposed for recording image by scanning exposure.

For example, Japanese Patent Publication (kokoku) No. 3781/1984 teaches a stereoscopic image recording system in which a plurality of original images are taken with a TV camera, processed and stored in frame memories, from which the stored image signals are retrieved sequentially as (linear) images in accordance with the pitch of lenticular lenses used and, after the linear images are recorded on a recording material by scanning exposure, the lenticular sheet is bonded to the recording material.

Japanese Patent Application (kokai) NO. 295296/1989 teaches a method of preparing a stereoscopic variable pixel forming sheet, in which data for coordinates in a solid space that have been obtained from a plurality of original images carrying inherent continuous parallax information or time differential information are split into linear images that are assigned to zones corresponding to the lenticular lenses on a lenticular sheet and the thus formed pixels for stereoscopic image are aligned in reverse order with respect to the parallax or time differential information and recorded on a recording material, followed by bonding the lenticular sheet onto the recording material.

In the apparatus for recording stereoscopic images by scanning exposure, each original image is split into linear images on the basis of the image information carried by the plurality of original images and, after the linear images are recorded on the recording material, it must be bonded to the lenticular sheet in registry to assure that the interval of recording the linear images is in exact agreement with the pitch (P) of lenticular lenses on the lenticular sheet. In the absence of registry, a satisfactory stereoscopic vision of the recorded images cannot be achieved and, what is more, other disadvantages will occur as exemplified by the formation of an inverted stereoscopic image or a multiple image.

To summarize the foregoing description, the apparatus for recording stereoscopic images by scanning exposure operates basically in the following steps. First, the information on a plurality of original images obtained with a TV camera or some other imaging device is processed as linear image information. The image information is then transferred to a scan exposing unit, where a light beam modulated in accordance with the image information performs sequential scan exposure in such a way that the linear images of the respective original images will be assigned to the lenticular sheet in a predetermined order, with one linear image for each original image falling within one pitch of lenticular lenses on the sheet, whereby the linear images are recorded on a recording material G.

Take, for example, the case of processing four original images a, b, c and d. As shown in FIG. 26, the linear images of these four original images are individually recorded in a predetermined order in accordance with the pitch P of lenticular lenses on the lenticular sheet and this recording procedure is repeated for each pitch P, whereby the linear images associated with the four original images a, b, c and d are recorded on the recording material G in a periodic and sequential manner.

When all original images have been recorded on it, the recording material G is bonded to the lenticular sheet with care being taken to insure registry so that the interval of recording the original images (a, b, c and d in the case under consideration) is in exact agreement with the pitch P of lenticular lenses on the lenticular sheet, whereby the recording of a stereoscopic image is completed.

With such apparatus for recording stereoscopic images by scanning exposure, changes in the magnification as for enlargement or reduction of the size of image to recorded can be effected merely by electrical processing of the image information readout; hence, the apparatus involves no disadvantages such as the increase in the complexity of the optics and various image processing operations such as sharpness correction and edge enhancement can be accomplished in an easy manner. As a further advantage, a single scan exposing unit will basically suffice for image recording even if the number of original images increases and, hence, there are no problems such as the increase in the size and complexity of the overall system which would otherwise occur if more than one scan exposing unit had to be used.

On the other hand, the stereoscopic recording apparatus that rely upon scanning exposure have the problem that no image can be recorded on a lenticular recording material that has a recording layer formed as an integral part of the rear side of a lenticular sheet and it is necessary that the recording material (indicated by G in FIG. 26) on which the linear images of original images have been recorded should be bonded to the lenticular sheet C in such a way that the interval of recording the respective original images is in exact agreement with the pitch P of the lenticular lenses on the lenticular sheet. As already mentioned, in the absence of registry, not only is it impossible to accomplish a satisfactory stereoscopic vision of the recorded images but other disadvantages will also occur as exemplified by inverted stereoscopic image or multiple image.

The lenticular sheet C may sometimes have a pitch (P) greater than 5 mm if it is to be used with a large display in a wide place but in the case of ordinary stereoscopic photography, P is usually in the range of ca. 0.1–0.3 mm. Therefore, bonding the lenticular sheet C in exact registry with the recording material G having the linear images recorded thereon is a work that requires great skill and considerable time. Furthermore, it is very difficult to achieve exact registry between the two members and, hence, stereoscopic images of high quality cannot be produced with good efficiency.

Another problem with the stereoscopic images produced on the lenticular sheet, particularly in the case where only a few original images are to be recorded as by a twin-lens system, is that many portions of the lenticular recording material will remain blank (no linear images are recorded) and, hence, the positions of the viewers eyes in which he can attain stereoscopic vision are extremely limited and, outside this narrow range, there occurs a sharp drop in the optical density (hereunder referred to simply as "density") and not only is the three-dimensional depth of the image impaired but it may also occur that the image sometimes becomes totally invisible depending on the positions of the eyes.

It is known that the defects described above can be lessened by increasing, in suitable amounts, the line width of linear image elements formed in the lenticular lenses so that fewer portions of the lenticular recording material will remain blank. On the basis of this idea, various methods have been proposed to increase the line width for use in the technology of optical recording of stereoscopic images. For example, Japanese Patent Publication (kokoku) Nos. 607/1974 and 7981/1983 has proposed a method that relies upon moving a lenticular recording material relative to exposing light that carries two-dimensional images; Japanese Patent Publication (kokoku) No. 33847/1978 has proposed a method that involves tilting (or oscillating) a lenticular recording material through a predetermined angle with respect to exposing light; and Japanese Patent Publication (kokoku) No. 25902/1974 has proposed a method in which a lenticular recording material is exposed, with a certain means attached for increasing the line width (said means is detached when viewing the recorded image).

However, all of these methods of increasing the line width have various defects; because of the need to provide a means of moving (oscillating) the lenticular recording material or projection lenses, as well as an additional optical member for increasing the line width, the optical stereoscopic image recording apparatus which is already complex in construction and which has many limitations in both optical and structural aspects becomes even more complex and, furthermore, the degree of freedom is design for adding the means of increasing the line width is low.

Such problems have not been solved at all in connection with the system of recording stereoscopic images by scanning exposure although it is simple in construction and provides great flexibility in adaptation for various image processing operations, alterations in the specifications of the lenticular recording material, and even the need to readjust the number of original images to be recorded. A particular need, therefore, exists for implementing a technique that performs scanning exposure to record stereoscopic images on a lenticular recording material having a record stereoscopic images on a lenticular recording material having a recording material formed on the rear side of a lenticular sheet and which yet is capable of adjusting (increasing) the line width.

As already mentioned, in order to record the linear images of original images in predetermined positions on the recording layer (or material) in combination with the lenticular sheet, the original images are projected via the lenticular sheet in an optical apparatus or, alternatively, each of the original images is split electrically into linear images in a scan-exposure based apparatus, followed by recording of those linear images in predetermined positions, and stereoscopic vision is produced by viewing the recorded linear images through the lenticular sheet.

Under the circumstances, those portions of the linear images which correspond to the respective original images are preferably recorded within the same pitch of lenticular lenses on the lenticular recording material F. In fact, however, the original images to be used in recording stereoscopic images are taken with a multi-lens camera or the like and are obtained from different viewpoints. Hence, not all of the portions of the linear images that correspond to the original images can be recorded within the same pitch and the more usual practice is to perform image recording in such a way that the linear images of the principal objects of original images will come into registry with one another. If stereoscopic images are not recorded with the appropriate registry of such principal objects, the incorrectly set three-dimensional depth makes it impossible to produce satisfactory stereoscopic vision and, instead, either multiple images or less attractive flickery images will result.

The apparatus for recording stereoscopic images by optical projection has a screen or some other suitable member provided in the same position as the lenticular recording material and, before they are printed on that recording material, the original images are projected onto the screen and registration of their principal objects is achieved by a suitable method such as positional adjustment of an optical member, say, the angular adjustment of a mirror in the projection optics.

However, the optics of an apparatus for recording stereoscopic images by projection, in particular, the optics of an apparatus that is capable of printing a multiple of original images so as to enable the recording of high-quality stereoscopic images, has such a complex construction that it is difficult to adjust optical members manually. Providing an actuator or some other suitable means for adjusting optical members is not preferred since it makes the optics even more complex. To avoid this problem, exposure must be performed for each original image and the process of performing exposure after adjustment of the optics for achieving registration of the principal objects has to be repeated for successive original images; this increases the time and work necessary for completing the production of stereoscopic images.

The system of recording stereoscopic images by scanning exposure is simple in construction and provides great flexibility in adaptation for various image processing operations, alterations in the specifications of the lenticular recording material, and even the need to readjust the number of original images to be recorded. In this system, registration of the principal objects is effected almost exclusively by taking the original images either after adjusting the camera in such a way that the principal object of each original image is located in a specified position on the image plane (original image) or with the distance to the original images set at the standard value. In other words, setting the principal object in a desired position on a particular original image and recording a stereoscopic image on the lenticular recording material in conformity with that setting is not a commercial practice today.

Under the circumstances, there has been a strong need to develop a method and apparatus that are capable of performing scanning exposure to record stereoscopic images on a lenticular recording material using a lenticular sheet and which yet are capable of effecting satisfactory registration of the principal objects of original images.

BRIEF SUMMARY OF THE INVENTION

The present invention has been accomplished under these circumstances and a first object thereof is to provide a method and apparatus for recording stereoscopic images, as well as a lenticular recording material suitable for use in that method and apparatus. The improved method and apparatus are capable of performing scanning exposure to record image on a lenticular recording material that has a recording layer formed as an integral part of the rear surface of a lenticular sheet. Hence, the method and apparatus have no need to bond the lenticular sheet to a recording material after recording linear images on the latter. As a further advantages, the method and apparatus have great flexibility in adaptation for the performance of various image processing operations such as changing the magnification of the image to be recorded and effecting sharpness correction, alterations in the specifications of the lenticular sheet and for the need to change the size of the image to be recorded. Because of these advantages, the method and apparatus under consideration are capable of producing stereoscopic images of high quality by a simple process.

A second object of the present invention is to provide a method and apparatus that are capable of performing scanning exposure to record stereoscopic images on a lenticular sheet having both a lenticular sheet and a recording layer and which allow the linear images to be recorded within one pitch of lenticular lenses on the lenticular sheet, with the widths of those linear images being adjusted for the respective original images, thereby enabling the recording of high-quality stereoscopic images.

A third object of the present invention is to provide a method and apparatus that are capable of performing scanning exposure to record stereoscopic images on a lenticular recording material using a lenticular sheet and which yet achieves satisfactory registration of the principal objects of original images to enable the recording of high-quality stereoscopic images.

The first object of the present invention can be attained in accordance with its first aspect which provides a method for recording stereoscopic images, which records a plurality of original images from different viewpoints, on a lenticular recording material having a recording layer provided on the rear side of a lenticular sheet, comprising the step of:

obtaining image information on said plurality of original images, forming discrete linear images that correspond to the pitch of lenticular lenses on said lenticular sheet, determining, in accordance with the conditions for recording the respective original images, the positions where the respective linear images based on said respective original images are to be recorded on said recording layer, in such a way that a completed stereoscopic image will come out correctly when it is viewed from the lenticular sheet side, and recording said linear images from the rear side of said lenticular recording material.

Preferably, said lenticular recording material is scan exposed two-dimensionally from the rear side with a light beam modulated in accordance with said linear images and said linear images are recorded as they are arranged sequentially in accordance with the conditions for recording the original images in such a way that a completed stereoscopic image will come out correctly when it is viewed from the lenticular sheet side.

Preferably, said linear images are represented on a display as they are sequenced in accordance with the conditions for recording the original images in such a way that a completed stereoscopic image will come out correctly when it is viewed from the lenticular sheet side and the displayed images are recorded on the rear side of said lenticular recording material.

The second object of the present invention can be attained in accordance with its second aspect which provides a method for recording stereoscopic images, by which linear images as produced from a plurality of original images from different viewpoints are recorded to produce a stereoscopic image on a lenticular recording material having a lenticular sheet and a recording layer, wherein a light beam modulated in accordance with the linear images to be recorded is deflected one-dimensionally in the fast scan direction which is generally parallel to the generatrix of said lenticular sheet while, at the same time, said lenticular recording material and the light beam deflected in said fast scan direction are moved relative to each other in the slow scan direction which is generally perpendicular to said fast scan direction, thereby scan exposing the recording layer of said lenticular recording material with said light beam, the spot diameter in the slow scan direction of the light beam incident on said recording layer and/or the number of times by which the linear images of the same original image are recorded within one pitch are adjusted in accordance with the pitch of lenticular lenses in said lenticular recording material so that the recording width of the linear images is increased in accordance with the pitch of lenticular lenses on said lenticular sheet.

The third object of the present invention can be attained in accordance with its third aspect which provides a method for recording stereoscopic images, by which a plurality of original images from different viewpoints are recorded on a lenticular recording material having a recording material provided on the rear side of a lenticular sheet, comprising the step of:

obtaining image information on said plurality of original images and information on the principal objects of the original images, splitting each original image into linear images, determining the positions in which the linear images are to be recorded on said recording layer in such a way that a completed stereoscopic image will come out correctly when it is viewed from the lenticular sheet side and that those linear images which carry at least the central portions of the principal objects of the original images are recorded within the same pitch of lenticular lenses in the lenticular recording material, thereby outputting image information that is to be recorded on said lenticular recording material, and scan exposing said lenticular recording material with the light beam modulated in accordance with said output image information, thereby recording a stereoscopic image.

The first object of the present invention can be attained in accordance with the first mode of its fourth aspect which provides an apparatus for recording stereoscopic images, which records a plurality of original images from different viewpoints on a lenticular recording material having recording material provided on the rear side of a lenticular sheet, comprising:

an image processing means that obtains image information on said plurality of original images, that forms linear images to be recorded for each of said original images, that determines the positions in which the linear images are to be recorded on said recording layer in accordance with the conditions for recording the original images in such a way that a completed stereoscopic image will come out correctly when it is viewed from the lenticular sheet side, and which outputs linear image information;

an image forming means that comprises a means that issues a light beam modulated in accordance with the linear image information delivered from said image processing means and which deflects said light beam one-dimensionally in the fast scan direction which is parallel to the generatrix of said lenticular sheet and a means by which said lenticular recording material and the light beam deflected in said fast scan direction are moved relative to each other in the slow scan direction which is generally perpendicular to said fast scan direction, said image forming means exposing the recording layer of said lenticular recording material from the rear surface with said light beam; and a means of determining the positions for image recording on said lenticular recording material.

The first object of the present invention can be attained in accordance with the second mode of the fourth aspect which provides an apparatus for recording stereoscopic images, which records a plurality of original images from different viewpoints on a lenticular recording material having a recording material provided on the rear side of a lenticular sheet, comprising:

an image processing means that obtains image information on said plurality of original images, that forms linear images to be recorded for each of said original images, that determines the positions in which the linear images are to be recorded on said recording layer in accordance with the conditions for recording the original images in such a way that a completed stereoscopic image will come out correctly when it is viewed from the lenticular sheet side, and which outputs linear image information;

a display on which said linear images are represented in accordance with said linear image information delivered from said image processing means; and a means of determining the positions for image recording on said lenticular recording material;

wherein the image represented on said display is recorded on the rear surface of said lenticular recording material as the longitudinal direction of said linear images is brought into substantial registry with the direction of the generatrix of said lenticular sheet while the sequence of said linear images in the transverse direction is allowed to correspond to the pitch of lenticular lenses is said lenticular recording material.

Preferably, said display has a means of adjusting the size of images to be displayed.

The second object of the present invention can be attained in accordance with its fifth aspect which provides an apparatus for recording stereoscopic images, with which linear images as produced from a plurality of original images from different viewpoints are recorded to produce a stereoscopic image on a lenticular recording material having a lenticular sheet and a recording layer, comprising:

an image processing means that obtains image information on said plurality of original images, that splits each of said original images into linear images to be recorded, that determines the positions in which said linear images are to be recorded on said recording layer, and which outputs image information;

an image forming means that comprises a light beam issuing unit for issuing a light beam modulated in accordance with the image information delivered from said image processing means, and a scanning unit that deflects said light beam one-dimensionally in the fast scan direction which is generally parallel to the generatrix of said lenticular sheet while, at the same time, said lenticular recording material and the light beam deflected in said fast scan direction are moved relative to each other in the slow scan direction which is generally perpendicular to said fast scan direction; and a means of increasing the width of said linear images to be recorded on said lenticular recording material.

Preferably, said means of increasing the recording width of said linear images is such that the spot diameter of the light beam emitted from the light beam issuing unit is increased in accordance with the pitch of lenticular lenses on the lenticular sheet.

Preferably, said means of increasing the recording width of said linear images is provided on said image processing means and it is such that the number of times by which the linear images of the same original image are recorded within one pitch is adjusted in accordance with the pitch of lenticular lenses in said lenticular recording material.

Preferably, the recording width of said linear images is increased by said recording width increasing means in such a way that said linear images can be recorded without any overlap and without producing any blank portions in the stereoscopic image recording regions of the lenticular recording material.

The third object of the present invention can be attained in accordance with its sixth aspect which provides an apparatus for recording stereoscopic images, by which a plurality of original images from different viewpoints are recorded on a lenticular recording material having a recording material provided on the rear side of a lenticular sheet, comprising:

an image processing means comprising a means that obtains image information on said plurality of original images and information on the principal objects of the original images and which splits each original image into linear images to be recorded, and a means of determining the positions in which the linear images are to be recorded on said recording layer in such a way that a completed stereoscopic image will come out correctly when it is viewed from the lenticular sheet side and that those linear images which carry at least the central portions of the principal objects of the original images are recorded within the same pitch of lenticular lenses in the lenticular recording material;

an image forming means that comprises a means that issues a light beam modulated in accordance with the linear image information delivered from said image processing means and which deflects said light beam one-dimensionally in the fast scan direction which is parallel to the generatrix of said lenticular sheet and a means by which said lenticular recording material and the light beam deflected in said fast scan direction are moved relative to each other in the slow scan direction which is generally perpendicular to said fast scan direction, said image forming means exposing the recording layer of said lenticular recording material with said light beam; and a means of determining the positions for image recording on said lenticular recording material.

The first object of the present invention can be attained in accordance with its seventh aspect which provides a lenticular recording material comprising: a lenticular sheet, a recording material provided on the rear side of the lenticular sheet, and an antihalation layer provided between the lenticular sheet and the recording layer.

DETAILED DESCRIPTION OF THE INVENTION

Figure 1:
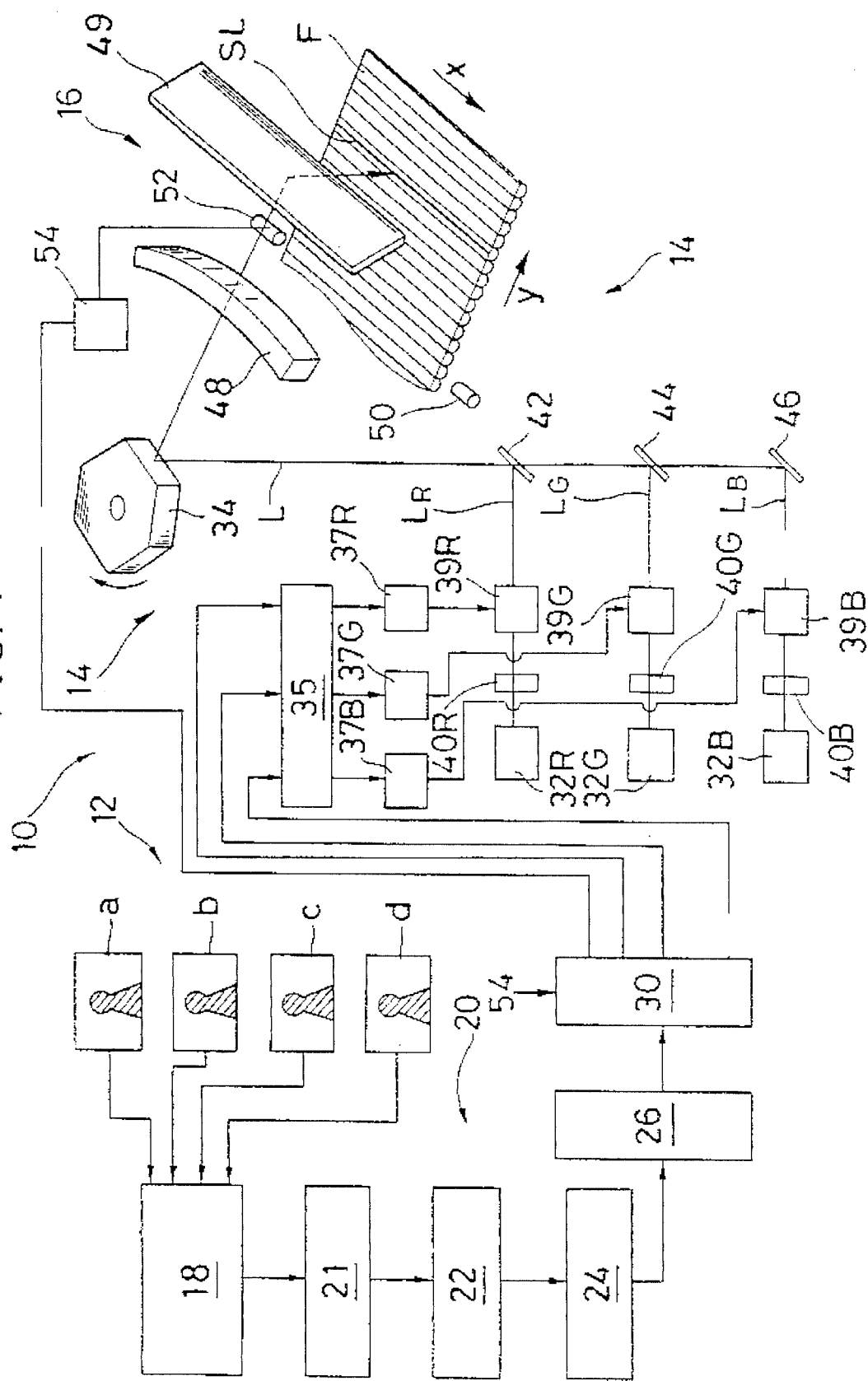
FIG. 1 is a diagram showing the concept of a stereoscopic image recording apparatus according to an embodiment of the present invention.
Figure 2A:
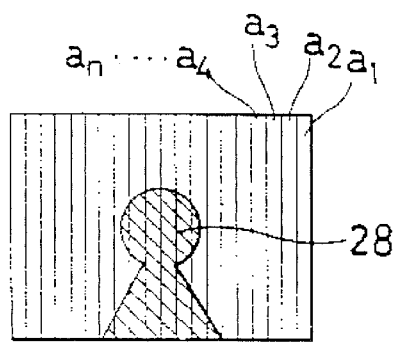
FIG. 2 shows conceptually how the linear images of original images are formed with the stereoscopic image recording apparatus shown in FIG. 1.
Figure 2B:
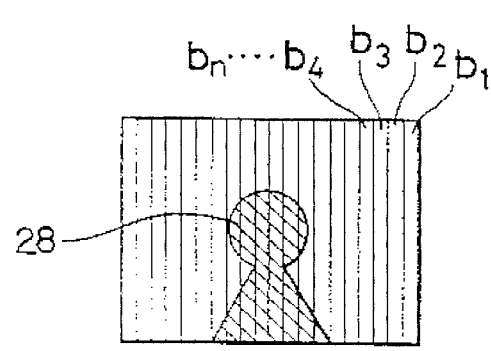
Figure 2C:
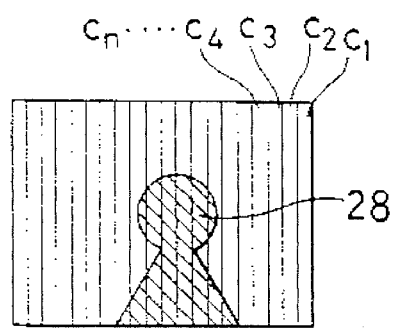
Figure 2D:
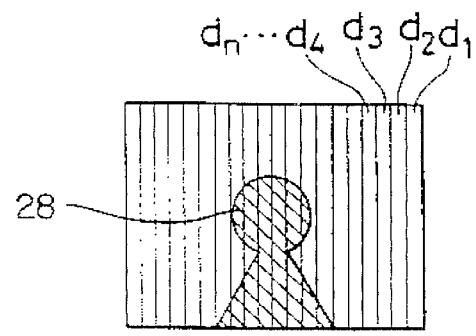

The various aspects of the present invention are described below in detail.

To begin with, the method of recording a stereoscopic image according to the first aspect of the present invention, the apparatus for recording a stereoscopic image according to the fourth aspect of the invention, as well as the lenticular recording material according to the seventh aspect of the invention are described in detail with reference to FIGS. 1–9.

The method of recording a stereoscopic image according to the first aspect of the present invention and the apparatus for implementing that method according to the fourth aspect of the invention are such that a stereoscopic image is produced by recording original images on a lenticular recording material having a recording layer formed on the rear surface of a lenticular sheet. A plurality of original images are read photoelectrically or otherwise processed to provide image information on said original images and, after performing various image processing operations such as the formation of linear images for each original image, determination of the positions at which those linear images are to be recorded and optional reversal inside out of the original images, the linear images of the respective original images are recorded from the rear side of the lenticular recording material.

An apparatus has heretofore been known that is capable of recording stereoscopic images on a lenticular recording material by an optical method which comprise allowing light of projection from more than one original image to be incident on the lenticular sheet at exposing angles that correspond to the conditions of shooting the original images, and separating each original image into linear images by the lenticular sheet so as to perform exposure on the recording layer. However, as pointed out in previous paragraphs, this recording apparatus suffers from the problem that it needs an extremely complex system layout in order to provide flexibility in adaptation to the need for changing the magnification of image as by enlargement or reduction, changing the size of image to be recorded, readjusting the number of original images for producing high-quality image, and changing the specification of the lenticular sheet.

On the other hand, the recording of a stereoscopic image by scanning exposure uses optics of a comparatively simple construction and it yet is known to have reasonable flexibility in adaptation for various image processing operations such as the change of magnification, adjustment of the number of original images to be recorded alternations in the specifications of the lenticular sheet and changes in the size of image to be recorded. However, the conventional system of recording stereoscopic images by scanning exposure is incapable of direct image recording on a lenticular recording material which is an integral unit of a lenticular sheet and a recording layer (recording material); instead, a variety of recording materials, after having the linear images of original images recorded thereon, have to be bonded to the lenticular sheet with care being taken to insure that the interval of recording the original images is in exact registry with the pitch P of lenticular lenses on the lenticular sheet; however, this requires extremely high skill and, hence, it is difficult and time-consuming to accomplish the work.

In accordance with the first and fourth aspects of the present invention, a lenticular recording material having a recording layer (recording material) provided as an integral part of the rear surface of a lenticular sheet is subjected to scanning exposure from the rear side, thereby recording a stereoscopic image. A plurality of original images are read or otherwise processed for each original image by a suitable imaging means such as a CCD camera so as to obtain image information on the original images; after performing various image processing operations such as the reversal inside out of the original image readout (this is necessary if the original images are read from the front side) and the formation of linear images in correspondence to the pitch of lenticular lenses on the lenticular sheet, the positions in which the linear images are to be recorded on the recording layer are determined in such a way that a complete stereoscopic image will come out correctly when it is viewed from the lenticular sheet side (the front side of the lenticular recording material); then, "scanning exposure" is performed from the rear side to effect image recording on the recording layer of the lenticular recording material or, alternatively, the array of linear images is represented on a display and the displayed images are recorded from the rear side of the lenticular recording material, whereby a stereoscopic image is recorded on the recording material.

According to the first and fourth aspects of the present invention described above, stereoscopic images can be recorded directly on the lenticular recording material having a recording layer on the rear surface of a lenticular sheet; hence, there is no need to bond the recording material to the lenticular sheet in precise registry with each other after recording the linear images of original images on the recording material, which work requires great skill and much time; as a result, stereoscopic images can be recorded with an extremely high efficiency compared to the conventional apparatus for recording stereoscopic images by scanning exposure.

Furthermore, in accordance with the first and fourth aspects of the present invention, image information on the original images is obtained and light beams modulated on the basis of that information are scanned to perform exposure on the lenticular recording material or, alternatively, the linear images of the original images are displayed and the displayed images are recorded on the lenticular recording material. Hence, one can alter the thickness of linear images (in particular, increase the line width), the distance between linear images, their density, etc. by electrical processing of image information and a simple adjustment of the optics and it is also easy to alter or adjust the image recording regions, image density, etc. As a result, there is insured great flexibility in adaptation for the adjustment of the number of original images to be recorded, the performance of various image processing operations such as changing the magnification of image to be recorded and shading correction, alterations in the specifications of the lenticular sheet, and the change in the size of image to be recorded.

Furthermore, image recording is performed from the rear side of the lenticular recording material and, hence, it is possible to prevent image deterioration such as uneven exposure due to the vignetting of lenticular lenses on the lenticular sheet, which problem has existed unavoidably in the conventional apparatus that performs optical recording of stereoscopic images on the lenticular recording material via the lenticular sheet.

Therefore, according to the first and fourth aspects of the present invention, there is insured an extremely high operational efficiency and, yet, stereoscopic images of high quality that conform to the specifications of the lenticular sheet used, the size of image to be recorded, etc. and which have been subjected to various image processing operations can be recorded with high degree of freedom.

According to the seventh aspect of the present invention, there is provided a lenticular recording material that is suitable for use in implementing the above-described method and apparatus for recording stereoscopic images; it has a recording layer provided on the rear side of a lenticular sheet, with an anti-halation layer being provided between the lenticular sheet and the recording layer.

With the conventional lenticular recording material which has a recording layer formed on the rear side of a lenticular sheet, image recording is effected from the front side (the lenticular sheet side), so an anti-halation layer is formed on the rear side of the light-sensitive layer. In contrast, the method and apparatus according to the first and fourth aspects of the present invention perform image recording from the rear side of the lenticular recording material (since the recording layer is provided on the rear side of the lenticular sheet, this means image recording is effected from the recording layer side); hence, the lenticular recording material to be used in the implementation of the present invention has an anti-halation layer formed between the lenticular sheet and the recording layer.

In this connection, it should be noted that the light-sensitive layers to be formed in the recording layer of the lenticular recording material in association with the three primary colors are preferably arranged in reverse order to the arrangement adopted by the recording layer (recording material) of the conventional lenticular recording material.

The above-described composition of the lenticular recording material of the present invention is the same as that of ordinary recording materials having no lenticular sheets and, hence, it can be developed with processors and processing solutions that are the same as what are used with ordinary recording materials. In addition, image recording (exposure) is performed without causing light to pass through the lenticular sheet and, hence, in the absence of any unwanted light scattering or absorption due to the lenticular sheet, natural and high-quality images can be recorded.

On the pages that follow, the method of recording a stereoscopic image according to the first aspect of the present invention, the apparatus for recording a stereoscopic image according to the fourth aspect, and the lenticular sheet according to the seventh aspect are described in detail with reference to the preferred embodiments shown in accompanying drawings.

FIG. 1 shows conceptually an apparatus for recording a stereoscopic image according to an embodiment of the present invention for implementing the method of its first aspect. The apparatus for recording a stereoscopic image (hereunder referred to simply as the "recording apparatus") which is indicated by 10 in FIG. 1 reads a plurality of original images as obtained from different viewpoints by an imaging device such as a multi-lens camera and records a stereoscopic image on the lenticular recording material of the present invention which is indicated by F. The following description assumes that four original images a, b, c and d are read for recording a stereoscopic image but, needless to say, the present invention is by no means limited to this particular case.

Figure 9:
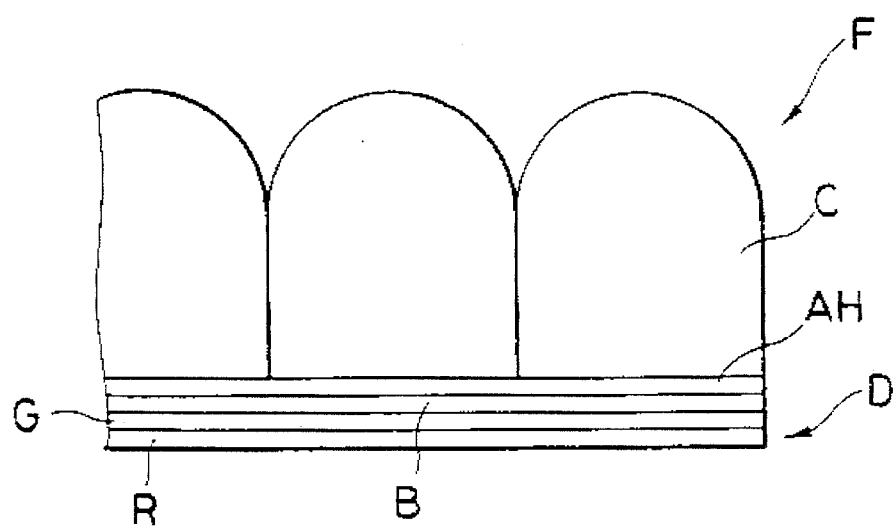
FIG. 9 is a diagram showing conceptually a lenticular recording material according to still another embodiment of the present invention.

The lenticular recording material F has a recording layer D formed on the rear surface of a lenticular sheet C (or it has a recording material bonded to the rear surface of the lenticular sheet C); the lenticular sheet C has an array of lenticular lenses that have a predetermined curvature (as of a cylindrical surface or paraboloid) on the front side where rays of light are to be incident and which have a refractive power only in the direction where curvature exists (see FIG. 9). The recording apparatus 10 of the present invention performs recording of a stereoscopic image by "scanning exposure" which is effected from the rear side of the lenticular recording material F (where the recording layer D is provided).

The lenticular recording material to be used with the recording apparatus 10 of the present invention (and the method for recording a stereoscopic image with that apparatus as well) is preferably the lenticular recording material F of the present invention which has an anti-halation layer AH formed between the lenticular sheet C and the recording layer D. Details of this point will be discussed later in this specification.

The recording apparatus 10 comprises basically the following components: an image processing means 12 that reads original images a–d photoelectrically and performs image processing of them to output linear image information that permits the completed stereoscopic image to come out correctly when it is viewed from the front side of the lenticular recording material F; an image forming means 14 that deflects in the fast scan direction (the main scan direction as indicated by arrow x in FIG. 1) a light beam L modulated in accordance with the linear image information supplied from the image processing means 12, that transports the lenticular recording material F in the slow scan direction (the subscan direction as indicated by arrow y in FIG. 1) which is generally perpendicular to the fast scan direction, and that scans over the lenticular recording material F two-dimensionally by means of the light beam L so that a stereoscopic image is recorded through scanning exposure; and a means 16 for achieving registry in the recording of image on the lenticular recording material F.

The image processing means 12 comprises a reading unit 18 for reading original images a–d and a linear image processing unit 20 with which the image information read by the unit 18 is processed to image information on the linear images to be recorded on the lenticular recording material F.

The reading unit 18 reads original images a–d photoelectrically by a solid-state imaging means such as a CCD camera, a CCD sensor or an image scanner and transfers them to the linear image processing unit 20 as color image information which consists of electric signals of the respective original images (the color image information may be associated with the three primary colors R, G and B). The original images (image information) may be not only color images but also monochromatic images; they also are not limited to common photographic images and may be the images produced in medical or scientific photography such as radiography and fundusgraphy (photography of fundus oculi) or they may be the images generated by a computer. The image information to be transferred to the linear image processing unit 20 may be either digital or analog information.

In this connection, it should be mentioned (although a detailed discussion will be made later in this specification) that the image information readout from the reading unit 18 is subsequently processed to form linear images into which each original image has been separated and which are to be recorded on the lenticular recording material F. Hence, if desired, the reading of image information (in one line) by the reading unit 18 may be effected in correspondence to the linear images or one scan line defined by light beam L so as to obviate the need for splitting each original image into linear images by the linear image processing unit 20 (i.e., formation of electric single data on the linear images). In other words, a splitter 22 in the linear image processing unit 20 may be omitted in the case described above.

There are no particular limitations on the reading unit 18 that can be used in the present invention and any of the known image reading units can be used, including the use of a CCD sensor or other solid-state imaging means mentioned above in combination with scan reading of the original images by slit scanning, raster scanning, drum scanner, etc., as well as a unit that is capable of reading the original images in one shot as in common photography.

If desired, a plurality of reading units 18, preferably as many reading units as the original images, may be used to realize a system capable of reading a plurality of original images simultaneously. Alternatively, original images may be read sequentially with a single reading unit 18.

The recording apparatus 10 of the present invention reads a plurality of original image (four original images in the case shown) photoelectrically, performs the necessary image processing to form linear images for each original image, and arranges (sequences) the linear images in such a way that a complete stereographic image will come out correctly when it is viewed from the front side of the lenticular recording material F, whereby the stereoscopic image is recorded from the rear side of the lenticular recording material F.

If the original images are read from the front side as in the case where they originate from a reflection document, they must be reversed inside out for recording; to meet this need, the reading unit 18 in the recording apparatus shown in FIG. 1 is equipped with a means of reversing the original image (information) readout inside out. There are no particular limitations on the reversal means and any of the known methods can be used such as the use of mirrors provided in the reading unit 18 or an "image processing" approach that effects reversal of the image information readout by signal processing. The reversal means is in no way limited to the one provided in the reading unit 18; it may be provided in the linear image processing unit 20.

If desired, the recording apparatus 10 may have a means of identifying the surface of original images (whether it is front or rear surface) for checking as to whether it is necessary to reverse the original images inside out, or a means of checking as to whether the original images are negative or positive.

There are no particular limitations on the method of identifying the surface of original images (whether it is obverse or reverse) or the method of checking as to whether the original images are negative or positive. Various methods may be used, such as mechanical or optical method of identification or checking that uses notches, sprocket holes, etc., and the provision of identification marks on the original images, which are read simultaneously with the reading of the original images to make check as to whether the surface of the original images is obverse or reverse. Alternatively, the operator may check as to whether the original images are obverse- or reverse-faced and he then enters the result while the reading unit 18 is reading the original images; or presetting is made as to whether the original images to be read by the reading unit 18 should be obverse- or reverse-faced and, depending on the setting, the operator may appropriately load the original images into the reading unit 18. In these alternative cases, there is no need to provide a special means of checking as to whether the original images are obverse- or reverse-faced or if they are negative or positive.

As will be described later in this specification, the recording apparatus 10 shown in FIG. 1 may be so composed that the principal object of each original image can be set by various methods such as using a digitizer or designating the principal object on a display screen on the reading unit 18 by a suitable device such as a mouse. The means of setting the principal objects is not limited to the one that is provided on the reading unit 18; it may be provided on the linear image processing unit 20 or the image forming unit 14 that are to be described later in this specification; alternatively, the reading unit 18, linear image processing unit 20 or image forming unit 14 may automatically set the respective principal objects by making judgment on the basis of the image information readout.

The image information on the original images a–d that has been read by the reading unit 18 is then transferred to the linear image processing unit 20. The linear image processing unit 20 comprises a pre-image processor 21, a splitter (linear image former) 22, sequencer 24 and an image processor 26 and it forms linear images to be recorded on the basis of the image information on the original images a–d and sequences the linear images of the respective original images (determine the positions in which they are to be recorded on the recording layer D) in such a way that the completed stereoscopic image will come out correctly when it is viewed from the front side of the lenticular recording material F. Further, the linear image processing unit 20 sets various parameters such as the distance between linear images to be recorded (sequenced), the width of linear images and the image recording regions on the basis of the specifications of the lenticular sheet C to be used and the recording conditions such as the magnification for image recording; after performing any necessary image processing operations such as density adjustment, color balance adjustment and sharpness correction, the processing unit 20 will transfer the image information on stereoscopic recording to the image forming unit 14.

On the basis of the image information on the original images a–d that have been sent from the reading unit 18, the pre-image processor 21 checks for the need to perform various image processing operations including the correction of various parameters such as color balance, density balance and sharpness, as well as edge enhancement and, if any of these image processing operations are found to be necessary, the pre-image processor will function accordingly. If desired, those correcting and image processing operations may be performed in response to manual data entry by the operator; alternatively, automatic judgment by the pre-image processor 21 may be combined with manual entry by the operator. In a special case, the pre-image processor 21 may be replaced by the image processor 26 or image former 14 which is modified to perform the same function as the pre-image processor 21.

The splitter 22 is supplied with the image information on the original images a–d that have been sent from the reading unit 18 and which have subsequently been processed by the pre-image processor 21 and forms linear images into which each original has been split and which are to be recorded on the lenticular recording material F.

Figure 24:
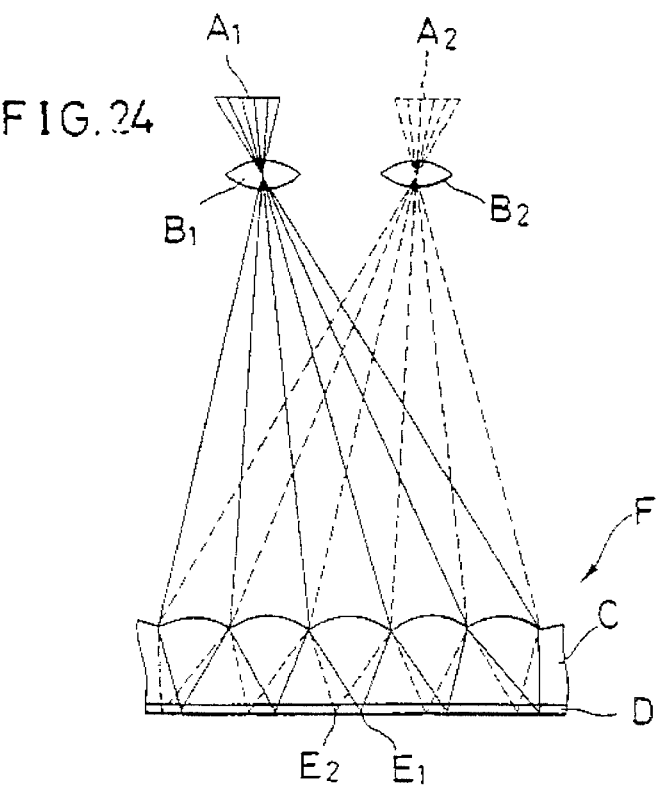
FIG. 24 is a diagram showing how image is recorded on a conventional lenticular recording material.
Figure 25:
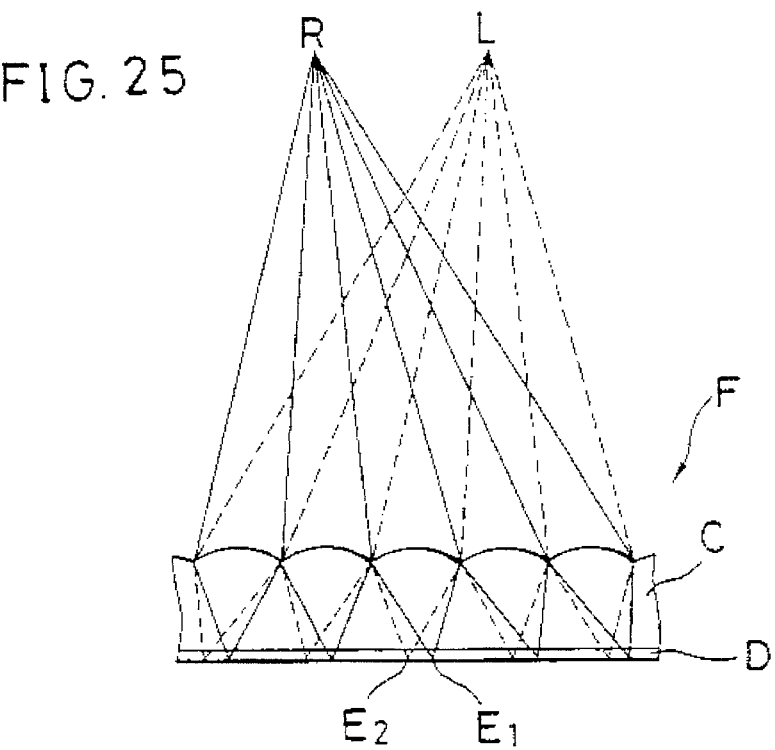
FIG. 25 is a diagram showing the theory behind the production of stereoscopic vision of the image recorded on a lenticular recording material.
Figure 26:
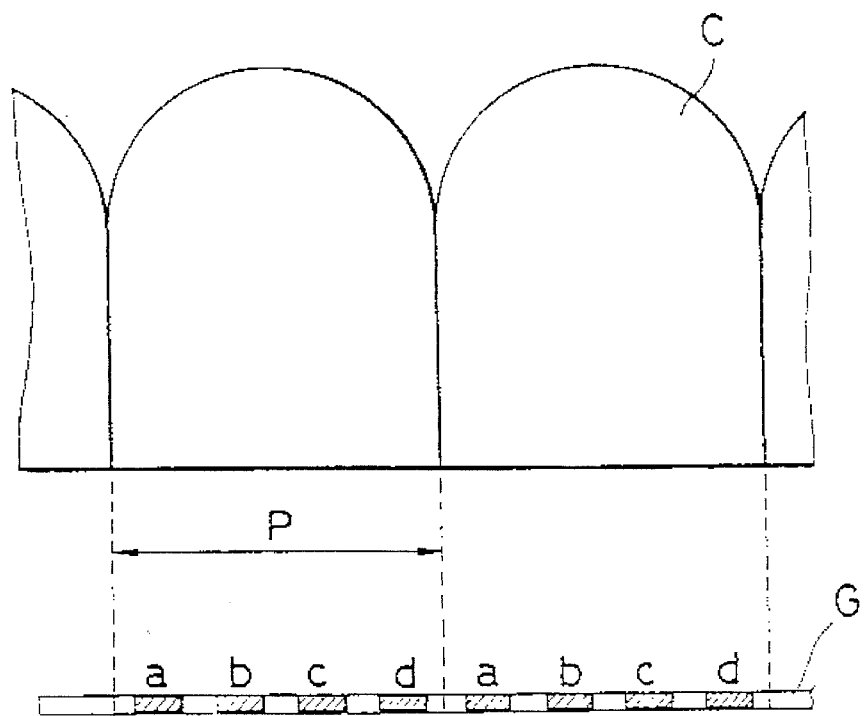
FIG. 26 is a diagram showing how stereoscopic image is formed by the conventional method of scanning exposure.

As already mentioned, the optical stereoscopic image recording system which causes the projecting light from the original images to be printed on the recording layer of the (lenticular) recording material is such that the projecting light from the original images is projected through projection lenses and split by the lenticular sheet C into linear images, which are then recorded on the recording layer (see FIG. 24).

In contrast, the recording apparatus 10 of the present invention reads the original images photoelectrically and performs scanning exposure to record a complete stereoscopic image on the recording material. The image information on the original images a–d which have been read by the reading unit 18 is processed as electric signal to form linear images to which each original image has been split. The splitter 22 splits each original image on the basis of the associated image information in accordance with various factors such as the stereoscopic image to be recorded and the specifications of the lenticular sheet C, whereby the linear images to be recorded on the recording layer D are formed as electric signals.

The image information from the reading unit 18 is usually transferred to the splitter 22 as line image information that corresponds to one line of readout (one scan) from the reading unit 18. Using the line image information from the reading unit 18 (if the readout line from the unit 18 corresponds to the line images to be recorded) or synthesizing (or splitting) the line image information as required, the splitter 22 forms linear images that are to be recorded and which, as shown in FIG. 2, are the result of splitting of individual original images; linear images $a_1, a_2, a_3, a_4, \ldots a_n$ are formed from the original image a; linear images $b_1, b_2, b_3, b_4, \ldots b_n$ are formed from the original image b; linear images $c_1, c_2, c_3, c_4, \ldots c_n$ are formed from the original image c; and linear images $d_1, d_2, d_3, d_4, \ldots d_n$ are formed from the original image d.

The formation of linear images (splitting of each original image) may be done as appropriate in accordance with the conditions of reading original images by the reading unit 18 or the conditions of recording stereoscopic images; such as the resolution of the reading unit 18 (as expressed by the number of read/scan lines, n), the pitch P of lenticular lenses on the lenticular sheet C, the recording magnification m of stereoscopic image (or the recording size as compared to the size of original image), the total number of pitches within one recording range of the lenticular recording material F, the spot diameter (effective write spot diameter) d of light beam L incident on the lenticular recording material F, and the number of original images o.

The various conditions of recording a stereoscopic images, such as the specifications of the lenticular sheet (e.g. pitch P), the size of the stereoscopic image to be recorded and the recording magnification m of the stereoscopic image, may be entered preliminarily by the operator or, alternatively, they may be set automatically by a suitable method such as prescanning of the original images or the selection of an appropriate lenticular recording material F to be used. If desired, entry by the operator may be combined with automatic setting of the recording conditions.

If, as mentioned previously, the reading apparatus 18 reads image information as line image information (preferably, the reading is performed in correspondence with the linear images and, more preferably, the number of read/scan lines is equal to the total number of lenticular lenses) and if the light beam spot has an appropriate diameter (recording width), the splitter 22 may be omitted.

The information on the linear images of original images that have been formed by the splitter 22 is then transferred to the sequencer 24, which sequences those linear images in the recording order that permits a complete stereoscopic image to come out correctly when it is viewed from the front side of the lenticular recording material F; namely, the sequencer 24 determines the positions where the respective linear images are to be recorded on the lenticular recording material F.

Figure 3:
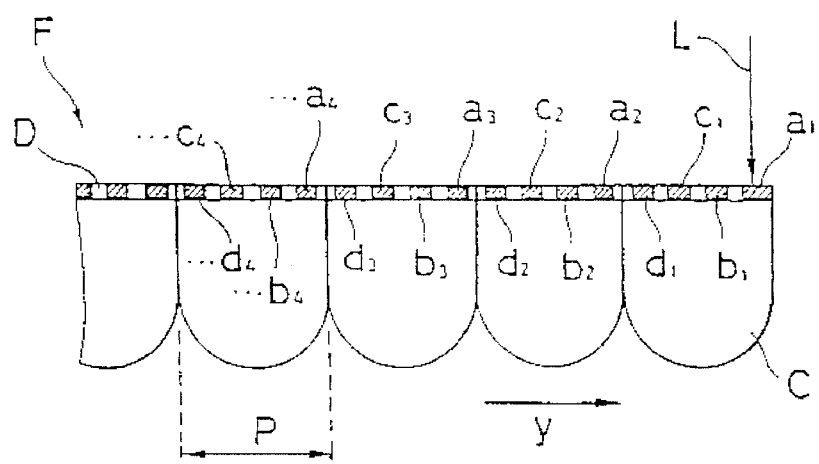
FIG. 3 is a diagram showing conceptually how linear images are recorded on a lenticular recording material with the stereoscopic image recording apparatus shown in FIG. 1.

In the case under consideration where four original images a–d are used to record a stereoscopic image, those portions of the linear images which correspond to the respective original images and which are to be sequenced within one pitch (P) of lenticular lenses on the lenticular sheet C are put together, whereby the linear images of the respective original images are arranged sequentially in the order of $a_1, b_1, c_1, d_1, a_2, b_2, c_2, d_2, a_3, \ldots$ as shown in FIG. 3.

The order in which the linear images of the respective original images are to be sequenced depends on the parallax order of recording (shooting) the original images. Take, for example, the case where the shooting position is directed from left to right, thereby providing the original images in the order from a to d, the linear images will be recorded in such a way that they are arranged sequentially, from left to right, in the order, as expressed in terms of original images, from a to d when the lenticular recording material is front-faced (as in the case of viewing the stereoscopic image).

Needless to say, the linear images should be sequenced in accordance with the principal object setting (as indicated by 28 in FIG. 2) or according to whether the original images are obverse- or reverse-faced, so that the stereoscopic image finally formed on the recording layer D will come out satisfactorily when it is viewed through the lenticular sheet C.

The linear images of the respective original images that have been sequenced in a predetermined order are then transferred to the image processor 26. In the image processor 26, the recording specifications such as the total number of lenticular lenses N and the number of pitches α on which the same linear image is to be repeated are set in accordance with the set values of recording conditions such as the number of linear images formed (or the number of read/scan lines) n, the pitch P of lenticular lenses on the lenticular sheet C, the recording magnification m (which may be set on the basis of the sizes of original images and the recorded image), the number of original images o, and the beam spot diameter d of light beam L; in accordance with these settings, the image processor 26 processes the input image information and transfers it to the image forming unit 14.

Table 1 shows three examples of the specifications for recording a stereoscopic image in accordance with various combinations of recording conditions as adopted by the recording apparatus of the present invention. The examples shown in Table 1 refer to the case where the read/scan lines for the respective original images are used straightforwardly as linear images.

TABLE 1

|  | Ex. 1 | Ex. 2 | Ex. 3 |
| --- | --- | --- | --- |
| Number of original images, o | 4 | 4 | 2 |
| Width of original image, w | 15 | 15 | 15 |
| Number of read/scan lines (linear lines), n | 1000 | 500 | 2000 |
| Recording magnification, m = W/w | 6.7 | 6.7 | 6.7 |
| Recording width of stereoscopic image, W | 100 | 100 | 100 |
| Pitch of lenticular sheet, P | 0.1 | 0.1 | 0.1 |
| Total number of lenticules used, N = W/P | 1000 | 1000 | 1000 |
| Maximum width of linear image, D = P/o | 0.025 | 0.025 | 0.05 |
| Beam spot diameter, d | 0.025 | 0.025 | 0.05 |
| Number of pitches on which the same linear image is repeated, α, | 1 | 2 | ½ |

Referring to Table 1, the term "the total number of lenticules used, N" means the number of pitches or lenticular lenses on the lenticular sheet that can be used for recording a stereoscopic image, and "the number of pitches on which the same linear image is repeated α) means the number of pitches on which the same linear image is recorded.

As Table 1 shows, if the maximum width of linear image D is equal to the beam spot diameter d and if the total number of lenticules used, N(=W/P) is equal to the number of linear images n (as in Example 1), linear images are recorded, one per pitch of the lenticular sheet. If n is smaller than N (Example 2), the same linear image is recorded repetitively on more than one pitch (two pitches in Example 2). If n is greater than N (as in Example 3), linear images are subsampled (1/2 in Example 3) for recording.

It should be noted here that the recording magnification m may be set on the basis of the width of original image w and the recording width of stereoscopic image W; alternatively, W may be set on the basis of w and m.

The recording apparatus 10 of the present invention is in no way limited to the case where only one linear image processing unit 20 is provided; if desired, more than one linear image processing unit may be provided exemplified by the case where one each of the line image processing units is provided for each original image.

In another preferred embodiment, the processed image information may be stored in a memory (line memory) for each original image and thence transferred to the image forming unit.

The image forming means 14 deflects in the fast scan direction (x direction) the light beam modulated in accordance with the linear images transferred from the linear image processing unit 20 and transports the lenticular recording material F in the slow scan direction (y direction) which is generally perpendicular to the fast scan direction, whereby the lenticular recording material F is scanned two-dimensionally from the rear side so as to record a stereoscopic image. The image forming means 14 uses three sources of light beam, 32R, 32G and 32B, and the light beams issuing from the respective sources are merged into a single light beam, which is deflected by a polygonal mirror 34 in the fast scan direction so as to perform scanning exposure on the lenticular recording material F from the rear side.

In the image forming means 14, the linear image information transferred from the linear image processing unit 20 is first transferred to an exposure control circuit 30. The exposure control circuit 30 receives linear image information from the image processor 26, namely, the information on R (red) signal, G (green) signal and B (blue) signal, and in accordance with the supplied image information signals, the circuit 30 performs not only D/A conversion but also various operations of exposure correction and signal processing and calculates the amount of exposure for each of the pixels. in one line for R, G and B, thereby determining the amount of exposure (modulation) for each of the pixels in one line for the respective light sources 32 (32R, 32G and 32B); thereafter, the image information signal is transferred to a nonlinear amplifier 35.

The nonlinear amplifier 35 is chiefly intended to compensate for the nonlinearity of an AOM (acoustooptical modulator) assembly 39; the image information signals corrected by the nonlinear amplifier 35 are transferred to drive circuits 37 (37R, 37G and 37B) for AOM assembly 39, whereupon the AOM assembly 39 (39R, 39G and 39B) is driven.

The light sources 32 will emit light beams at wavelengths of narrow band, to which the light-sensitive layers provided in the recording layer D of the lenticular recording material F, e.g., a red (R) sensitive layer, a green (G) sensitive layer and a blue (B) sensitive layer (see FIG. 9), have sensitivity;

the light source 32R will emit a light beam LR for exposing the R sensitive layer in the lenticular recording material F; the light source 32G will emit a light beam LG for exposing the G sensitive layer in the lenticular recording material F; and the light source 32B will emit a light beam LB for exposing the B sensitive layer in the lenticular recording material F; the light beams LR, LG and LB each have a constant output.

The sources of light beams that can be used in the present invention are in no way limited and any source of light beam may be used, as appropriately selected from among gas lasers (e.g. He—Ne laser), a variety of solid-state lasers, semiconductor lasers and LEDs depending on such factors as the type of recording layer D of the lenticular recording material F. If the recording layer D of the lenticular recording material F has spectral sensitivity in the visible range, a He—Ne laser corresponding to the R sensitive layer, an Ar laser corresponding to the G sensitive layer, and a He—Cd laser corresponding to the B sensitive layer may advantageously be used as light sources. If the recording layer is made of a false color light-sensitive material, a semiconductor laser (LD) or the like may advantageously be used. If desired, a light valve may be used as light source.

The light beams LR, LG and LB emitted from the associated light sources 32 have their beam spot diameter and other parameters adjusted by shaping means 40 (40R, 40G and 40B) such as beam expanders, collimator lenses, etc. that are provided in association with the respective light beams.

The light beams LR, LG and LB are subsequently launched into associated AOMs 39 (39R, 39G and 39B). Since the AOMs 39 are driven in association with the images (linear images) to be recorded, the intensities of the respective light beams that have been launched into the associated AOMs 39 are modulated in accordance with the images to be recorded. It should be mentioned here that the optical modulators that can be used with the recording apparatus 10 of the present invention are not limited to the AOMs 39 shown in FIG. 1 and any other optical modulators are applicable, as exemplified by a magnetooptical modulator and an electrooptical modulator.

The light beams modulated by the AOMs 39 are merged into a single light beam L by means of a light beam merger that is composed of two dichroic mirrors 42 and 44 and a single mirror 46. The dichroic mirror 42 has such characteristics that it reflects a light beam having the wavelength of light beam LR while transmitting the other light beams; the dichroic mirror 44 has such characteristics that it reflects a light beam having the wavelength of light beam LG while transmitting the other light beams. Therefore, the light beam LB is reflected by the mirror 46 and passes through the dichroic mirrors 42 and 44; the light beam LG is reflected by the dichroic mirror 44 and passes through the dichroic mirror 42; and the light beam LR is reflected by the dichroic mirror 42; consequently, the three light beams are merged into a single light beam. It should be mentioned here that the dichroic mirror 42 suffices to transmit at least the light beams LB and LG while reflecting the light beam LR, and that the dichroic mirror 44 suffices to transmit at least the light beam LB while reflecting the light beam LG.

The single light beam L is then incident on the polygonal mirror 34 working as a light deflector and is deflected in the fast scan direction (as indicated by arrow x in FIG. 1). The light deflector that can be used with the recording apparatus of the present invention is in no way limited to the polygonal mirror 34 and any known light deflector may be used, such as a galvanometer mirror or a resonant scanner. Needless to say, optics for correcting the tilting of the polygonal mirror 34 (light deflector) that is composed of cylindrical lenses, cylindrical mirrors, etc. may be provided across the polygonal mirror 34.

It should also be noted here that the present invention is in no way limited to the case of using "merging" optics in which a plurality of light beams are merged for image recording as shown in FIG. 1. Non-merging optics may also be used in either of the following to methods: the three light beams are allowed to be incident at essentially the same point on reflecting face of the polygonal mirror 34 but at slightly different angles, whereby the light beams are deflected in the fast scan direction so as to focus at different positions on the same scan line SL across the lenticular recording material F, with the scan line SL being scanned over sequentially at given time intervals; alternatively, the three light beams are allowed to travel at slightly different angles so that they will be incident at essentially the same point on the lenticular recording material F.

The light beam L deflected in the fast scan direction is adjusted by an f0 lens 48 so that it will be focused as a beam spot of a predetermined diameter in a predetermined position on the lenticular recording material F; thereafter, the light beam L is reflected in a predetermined direction by means of a bend-down mirror 49 so that it is incident at a predetermined position on the rear side of the lenticular recording material F, thereby defining a scan line SL for exposing the recording layer D.

The lenticular recording material F is transported by a slow scan transport means in the slow scan direction (indicated by arrow y in FIG. 1) generally perpendicular to the fast scan direction in such a way that the direction of the generatrix of the lenticular sheet C (its longitudinal direction) is in general agreement (generally parallel) to the fast scan direction. Therefore, the light beam L is eventually capable of two-dimensional scan exposure of the lenticular recording material F and, as shown in FIG. 3 (the fast scan direction is normal to the paper), the linear images of the original images are sequentially recorded at predetermined positions in a predetermined order (e.g., $a_1$, $b_1$, $c_1$, $d_1$, $a_2$, $b_2$, ...) in accordance with the recording positions (sequence) of the linear images that have been set by the linear image processing unit 20.

The linear images of the original images are in no way limited to the case where they are recorded by a single scan with the light beam L; if desired, more than one scanning with the light beam may be performed to record one linear image (how many scans should be done depends on the width set for individual linear images). Needless to say, scan lines SL that are at least equal in number to the original images must be defined within one pitch P of the lenticular recording material F.

As regards image recording that uses the lenticular sheet C to produce stereoscopic image, increasing the line widths of linear images to be recorded by suitable amounts (line width spread) is known to be an effective method. Preferably, the line widths of linear images of the respective original images are increased in such a way that the pitch P is filled completely with those linear images to leave no gaps or produce no overlaps (in the case shown, $a_1+b_1+c_1+d_1=P$).

The method of adjusting the line widths of linear images is not limited in any particular way and may be exemplified by the formation of a single linear image by more than one scan and the increase of beam spot diameter (this may be adopted when recording linear images by one scan using a beam expander, etc.)

The fast scan direction need not always coincide with the direction of the generatrix of the lenticular sheet C and it goes without saying that image recording may be performed with the slow scan direction being in agreement with the direction of the generatrix. However, for several reasons such as the relative ease in image processing and the possibility of recording a single continuous linear image, it is advantageous to have the fast scan direction coincide with the direction of the generatrix and, at the same time, one can anticipate the recording of high-quality stereoscopic images.

The means of transporting the lenticular recording material F in the slow scan direction is in no way limited and various known means for transporting sheet products may be used, as exemplified by: the use of two pairs of nip rollers that are disposed across scan line SL; the use of an exposure drum supporting the lenticular recording material F and two pairs of nip rollers that are disposed across scan line SL and which depress the exposure drum; the use of an exposure mount that secures the lenticular recording material F in a predetermined position by means of suction, etc. and which is moved by means of a screw transmission mechanism, etc.; and the use of belt conveyor.

The recording apparatus shown in FIG. 1 uses an optical modulator such as AOM 39 to modulate light beams but this is not the sole case of the present invention and the same result can be attained by pulse width modulation of light emission from the light sources 32 or by electrical intensity modulation of the light sources 32.

Figure 4:
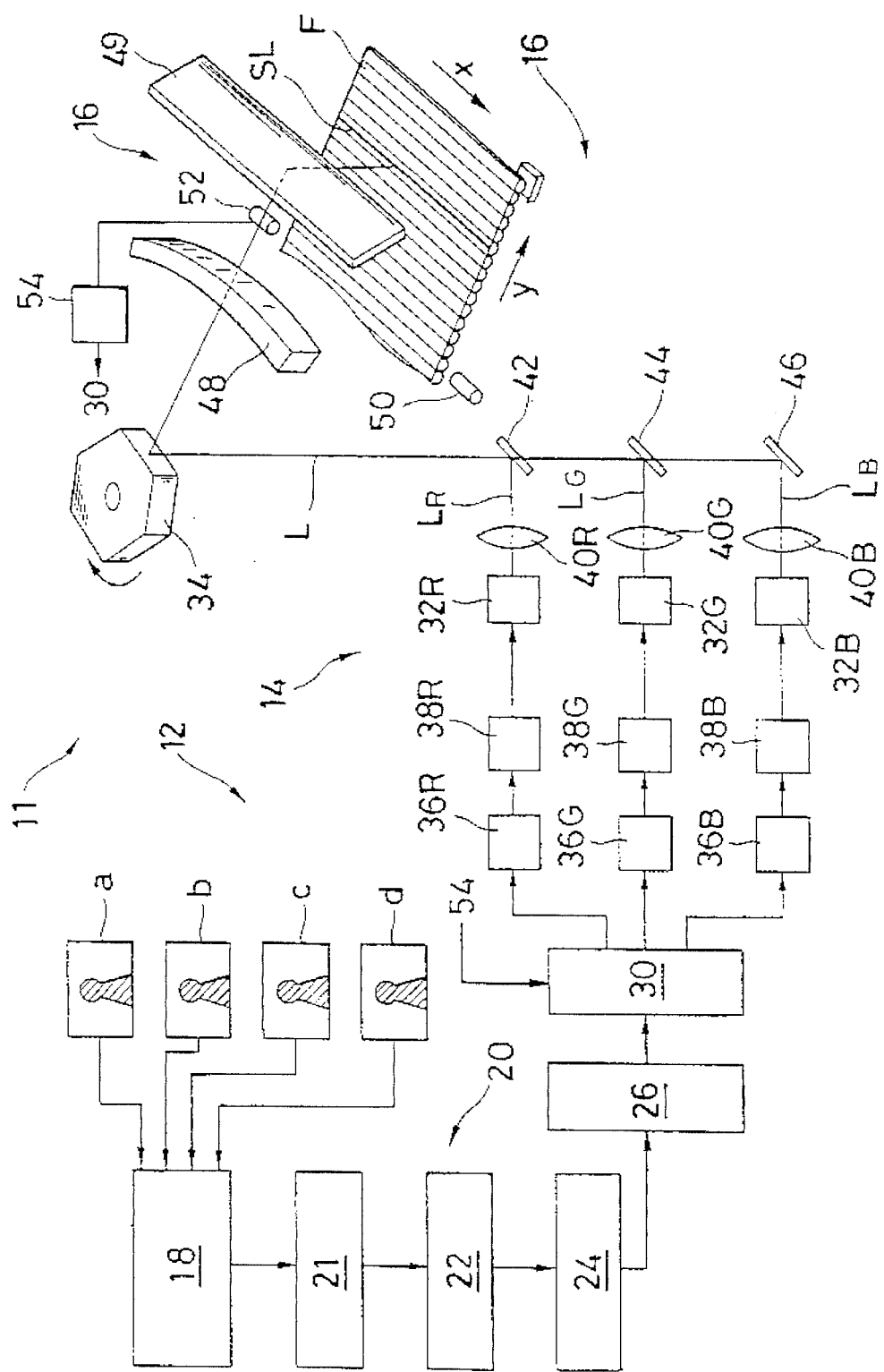
FIG. 4 is a diagram showing the concept of a stereoscopic image recording apparatus according to another embodiment of the present invention.
Figure 5:
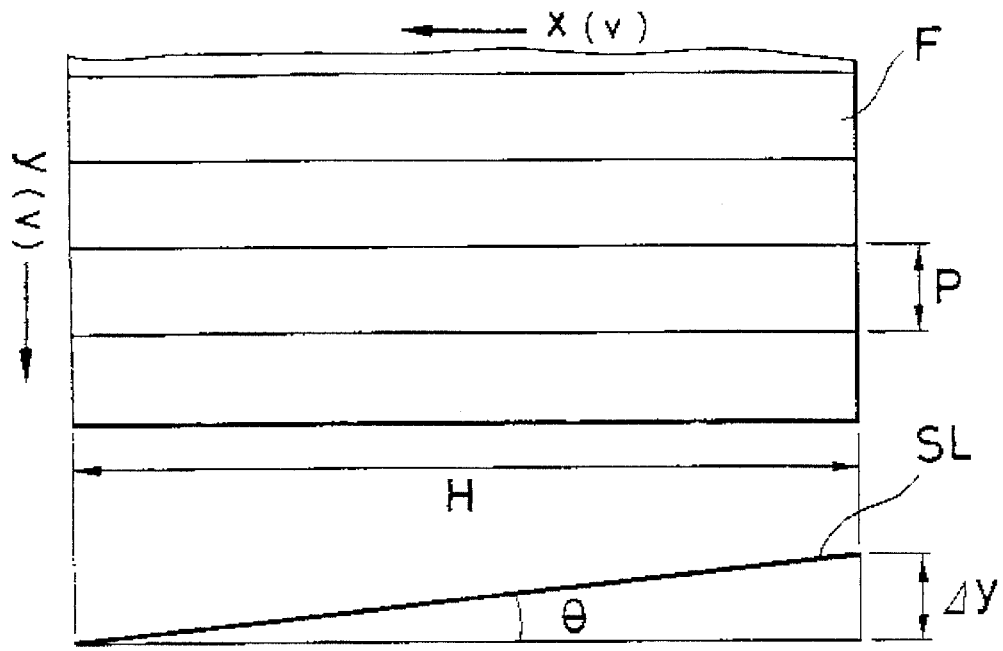
FIG. 5 is a line diagram illustrating the method of correcting a scanning line with respect to the generatrix on the stereoscopic image recording apparatus shown in FIG. 1.

FIG. 4 shows an example of recording apparatus that modulates light beams by pulse width modulation. The recording apparatus generally indicated by 11 in FIG. 4 has basically the same construction as the recording apparatus 10 except for the method of modulating light beams; hence, the members that are the same as those which are shown in FIG. 1 are identified by like numerals and will not be described in detail.

Referring to the recording apparatus 11 shown in FIG. 4, the exposure control circuit 30 determines the amount of exposure for one line of pixels in connection with each of the three light sources 32 (32R, 32G and 32B) and the thus determined amounts of exposure are transferred to modulation circuits 36. The modulation circuits 36 perform pulse width modulation on the light emission from the light sources 32 within a preset repetition period, say, one pixel period. When performing pulse width modulation in the image exposure system under consideration, the optical output of each light source 32 is set at a constant level and the time for which the light source 32 is excited to produce continuous emission within one pixel period for each pixel, namely, one continuous exposure time (for one pixel) is delivered to each drive circuit 38.

Drive circuits 38 (38R, 38G and 38B) are for driving the light sources 32 and, in the case of pulse width modulation, they supply the respective light sources 32 with drive currents for the optical outputs preset for those light sources for the time periods set for the individual pixels. As a result, each light source 32 emits light of the optical output present for each light source for the time period determined for each light source in association with the ith pixel. This is effected for one line of pixels, whereby each light source 32 performs one-line exposure.

The light beams LR, LG and LB issuing from the light sources 32 are shaped by associated shaping means 40 (40R, 40G and 40B) and then merged into a single light beam by means of a light beam merger to be described later in this specification; the resulting single light beam is used to expose the lenticular recording material F by scanning.

As already mentioned, both recording apparatus 10 and 11 perform image recording on the lenticular recording material F with the light beam L deflected in the fast scan direction as it is moved in the slow scan direction. In addition, the direction of the generatrix of the lenticular sheet C is generally in agreement with the fast scan direction. If, under the circumstances, the lenticular recording material F is transported continuously, the scan lines SL defined by the light beam L will eventually form an angle with respect to the generatrix of the lenticular sheet C.

With ordinary image recording apparatus, this deviation of scan lines SL will not be a serious problem; however, when one attempts to record a stereoscopic image using the lenticular sheet C as in the case of the present invention, the deviation of scan lines SL with respect to the generatrix of the lenticular sheet C will cause great deterioration in image quality. Furthermore, if the slow scan speed of the lenticular recording material F is great or the pitch P of lenticular lenses on the lenticular sheet is small compared to the fast scan speed of the light beam L, scan lines SL might be defined over 2 pitches. To solve this problem, one may calculate the angle of deviation of scan line SL on the basis of the relationship between the slow and fast scan speeds, thereby correcting the fast scan direction, x, of the light beam L by angle θ that causes each scan line SL to coincide with the direction of the generatrix of the lenticular sheet C.

If the lenticular recording material F having width H in the fast scan direction is transported at the slow scan speed V as it is scanned over with the light beam L at the fast scan speed v (see FIG. 5), then the deviation Δy in the slow scan direction between the scan start and end points of light beam L is expressed by:

$$\Delta y = H \times (V/v).$$

Therefore, the angle θ formed between the horizontal line and the scan line SL defined by the light beam L is:

$$\theta = \Delta y/H = V/v.$$

If the fast scan direction x is set with the angle θ being taken into account, the scan line S1 defined by the light beam L can be brought into substantial agreement with the generatrix of the lenticular sheet C, whereby a satisfactory stereoscopic image can be recorded.

The angular adjustment described above may also be effected by adjusting the angle of the lenticular recording material F.

The method for bringing the scan line SL into agreement with the generatrix of the lenticular sheet C is in no way limited to the method just described above. According to an alternative method, the lenticular recording material F is transported in the slow scan direction with repeated stop and go and its transport and the modulation of light beam I (image recording) are controlled in such a way that image recording with the light beam is effected when the recording material F stops.

For producing a satisfactory stereoscopic image using the lenticular sheet C, it is important that predetermined linear images (four linear images in the case shown) be recorded within the pitch P of lenticular lenses on the lenticular sheet C. Therefore, using a means of achieving registry in image recording on the lenticular recording material F is preferred for the purposes of the present invention, and the recording apparatus 10 and 11 shown in FIGS. 1 and 4 are equipped with the registration means 16 that relies upon light detection.

The registration means 16 provided in the recording apparatus 10 and 11 comprises a light-emitting device 50, a light-receiving device 52 and a recording position control circuit 54 connected to the light-receiving device 52. The light-emitting device 50 and the light-receiving device 52 for receiving detection light 56 (see FIG. 6) from the light-emitting device 50 are provided at opposite ends of the lenticular recording material F in the fast scan direction. The recording position control circuit 54 is connected to the exposure control circuit 30.

The light-emitting device 50 in the registration means 16 may typically emit detection light 56 (which is parallel to the generatrix of the lenticular sheet C) in such a position that it passes between adjacent ridges formed by lenticular lenses. The detection light 56 is preferably such that its wavelength or quantity is insufficient to expose the recording layer D.

Since the lenticular recording material F is transported at a predetermined speed in the slow scan direction (as indicated by arrow y in FIG. 6), the detection light 56 is blocked periodically by the lenticular sheet C (the array of lenticular lenses) and the quantity of detection light 56 being received by the light-receiving device 52 will vary accordingly.

The recording position control circuit 54 detects (counts) the changes in the quantity of detection light 56 and, when the number of such changes reaches a predetermined value, the circuit senses that the lenticular recording material F has been transported to a predetermined position, whereupon a signal for the start of image recording is sent to the exposure control circuit 30.

In response to this start signal, the exposure control circuit 30 starts to transfer image information so that the light beam L will start image recording at the predetermined position; thereafter, in response to signals for the detection of individual lenticular lenses, the circuit 30 transfers pitch-associated image information for every pitch P of lenticular lenses on the lenticular sheet C.

Generation of image recording start signals from the recording position control circuit 54 is in no way limited to the approach of counting the changes in the quantity of light. An alternative design may be such that a start signal is generated when a predetermined time has passed after the detection light 56 is first blocked by the lenticular recording material F to experience a change in quantity. In this alternative case, the detection light 56 need not pass between adjacent ridges formed by lenticular lenses and the only requirement to be satisfied is that the light-emitting device 50 and the light-receiving device 52 be provided in positions where the detection light 56 is blocked by the lenticular recording material F when it has been transported to the predetermined position.

Other methods for generating start signals include: detecting the ridges and grooves in the lenticular sheet C per se by a mechanical, pneumatic or otherwise technique; or forming a detection means such as sprocket holes or notches in the lenticular recording material F and providing the light-emitting device 50 and the light-receiving device 52 in the corresponding positions so that the recording positions are brought into registry on the basis of the change that occurs in the quantity of detection light 56 when it passes through said detection means.

Figure 6:
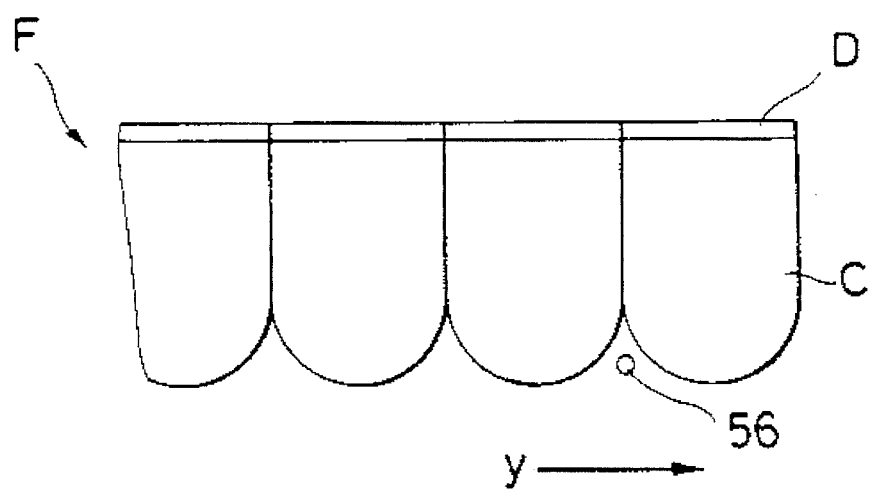
FIG. 6 is a diagram showing conceptually the means of achieving registration of image recording positions on the stereoscopic image recording apparatus shown in FIG. 1.

The means of achieving registration of the positions for image recording with the recording apparatus 10 and 11 is in no way limited to the method shown in FIG. 6 which relies upon the detection of light. Other methods that can be used with advantage include: sensing detection means such as sprocket holes or notches by a mechanical method; or detecting the position of the lenticular recording material F by means of encoders or the like that are provided on transport rollers or the like for the recording material.

Registration of the image recording positions may be performed only at the time of starting the recording process; alternatively, detection by a suitable method such as light detection may be performed either periodically or continuously and the result of detection is fed back to achieve periodic or continuous registration of the image recording positions.

The recording apparatus 10 and 11 which have been described on the foregoing pages are such that they cause the light beam L to be deflected in the fast scan direction as the lenticular recording material F is transported in the slow scan direction, whereby scan exposure is performed on said recording material F to record a stereoscopic image thereon. However, this is not the sole case of the present invention and other scanning methods may also be adopted. In one of such alternative methods, the lenticular recording material F is fixed in a predetermined position whereas the angle of a light deflector such as polygonal mirror 34 or a galvanometer mirror is altered in the slow scan direction, whereby the scan line SL defined by the light beam L is moved in the slow scan direction so as to record a stereoscopic image over the entire surface of the lenticular recording material F.

If the recording apparatus includes a mirror for bending down the light beam L as exemplified by the mirror 49 used in the cases shown in FIGS. 1 and 4, the angle of that mirror may be adjusted in the slow scan direction so as to perform slow scanning with the light beam L. If desired, a mirror specifically intended for performing slow scanning with the light beam L may additionally be provided.

Figure 7:
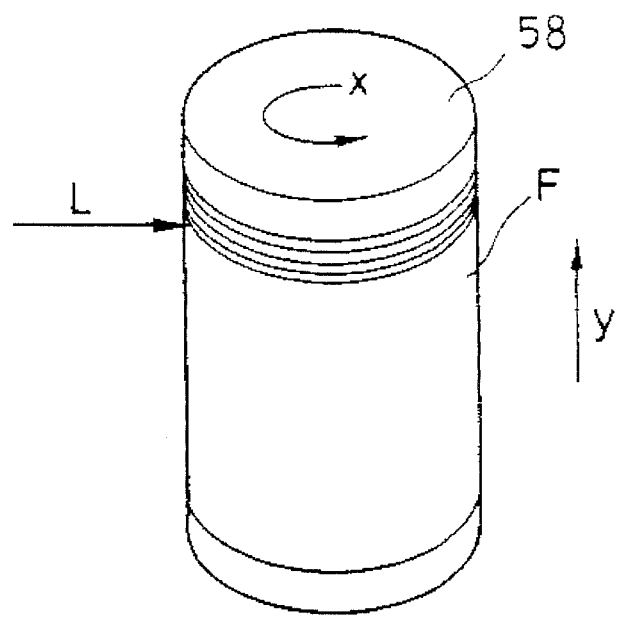
FIG. 7 is a perspective view showing schematically another embodiment of the fast and slow scanning means that can be used in the stereoscopic image recording apparatus of the present invention.

Another scanning means that may be used in the present invention is a "drum scanner" which is described below briefly with reference to FIG. 7; the lenticular recording material F is secured to a cylindrical drum 58 and as the light beam L is allowed to be incident in a predetermined exposing position on the drum surface, the drum 58 is rotated in the fast scan direction (indicated by arrow x) while it is moved in the slow scan direction (indicated by arrow y), whereby the lenticular recording material F (on the drum 58) is subjected to both slow and fast scanning so as to perform two-dimensional scanning of the lenticular recording material F.

In this alternative case, too, slow scanning with the light beam L may be accomplished not by moving the drum 58 in y direction but by changing the angle of the light deflector or mirror or by moving the optics for light beam L in the slow scan direction.

The foregoing description assumes the use of one or more reading units 18 to read the four original images a–d, followed by line sequential recording of a stereoscopic image (linear images) on the lenticular recording material F. However, this is not the sole case of the present invention and the reading of one or more original images may alternate with the recording of the associated linear image(s) to record a stereoscopic image.

This alternative case may be implemented by the following procedure. First, original image a is read and, after being subjected to the same image processing operations as already described above by the image processing means 12, such as formation of predetermined linear images and determination of their recording positions, the image information on the original image a is sent to the image forming means 14. In response to this image information, the linear images into which the original image a has been split are recorded sequentially in the predetermined positions on the lenticular recording material F; in the case shown in FIG. 3, the linear images $a_1, a_2, a_3, a_4, \ldots$ of the original image a are recorded sequentially.

When the recording of the original image a is completed, subsequent original images b, c, ... are read and recorded sequentially in the same manner as just described above, whereupon the recording of a complete stereoscopic image ends.

The above description of image recording procedure will equally apply to the case where a plurality of original images which are less than the total number of original images to be recorded are subjected to repeated cycles of reading and recording operations. If desired, image recording in the manner described above may be carried out after all original images of interest are read.

The reading of original images may proceed in parallel with the recording of associated linear images. When the reading unit 18 reads original image a for one scan line or one linear image, the image information data are sequentially transferred to the image processing means 12, where they are subjected to various image processing operations such as the splitting of the original image into linear images and sequencing thereof (determining the recording positions of linear images), and the thus processed image information data are transferred sequentially to the image forming means 14. In response to the input image information, the image forming means 14 forms the corresponding linear images ($a_1$, $a_2$, $a_3$, $a_4$, ... ) which are recorded as shown in FIG. 3. Thus, in the embodiment under consideration, the recording of linear images of the original image a starts with a delay of one to several scan lines behind the reading of original image a and, thereafter, the two operations are performed in parallel to each other.

In the next place, consider the case of using as many image processing means 12 as the original images (or using a single reading unit 18 in combination with as many linear image processing units 20 as the original images). A plurality of original images are read either simultaneously or sequentially and the respective original images are processed by separate linear image processing units 20; using a switcher or the like, each linear image processing unit 20 is switched to the image forming means 14 and vice versa per recording of one linear image, so that the information data on the linear images of the respective original images are transferred sequentially (i.e., $a_1$, $b_1$, $c_1$, $d_1$, $a_2$, $b_2$, ... ) to the image forming means 14, whereby the linear images are recorded on a line sequential basis on the lenticular recording material F.

This embodiment is also applicable to the case where the number of image processing means 12 (linear image processing units 20) is smaller than that of the original images to be recorded.

It should also be noted that the recording apparatus 10 and 11 of the present invention may employ more than one image forming means 14 so that a plurality of linear images are recorded simultaneously. Particularly high efficiency is insured for the recording of stereoscopic image if the image processing means 12 and the image forming means 14 each of which is equal in number to the original images to be recorded and if the reading of all original images is performed simultaneously with the recording of linear images.

Figure 8:
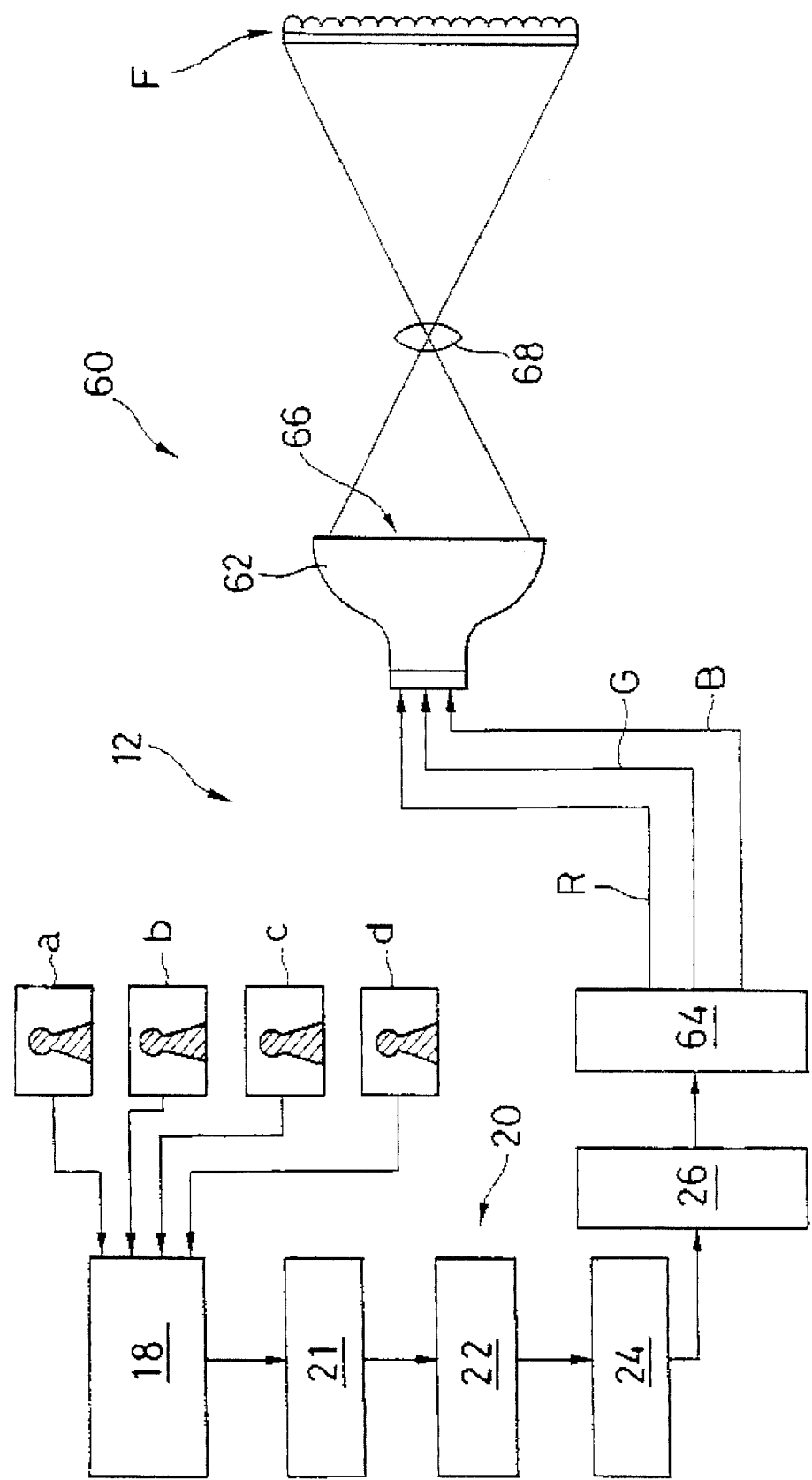
FIG. 8 is a diagram showing conceptually a stereoscopic image recording apparatus according to another embodiment of the present invention.

FIG. 8 is a diagram showing schematically an apparatus for recording a stereoscopic image according to a second embodiment of the present invention.

The recording apparatus 10 shown in FIG. 1 is such that original images a–d are read photoelectrically and subjected to image processing by the image processing means 12 and the light beam L modulated in accordance with the processed image information is used to expose the lenticular recording material F from the rear side. The recording apparatus generally indicated by 60 in FIG. 8 uses a display as an image forming means and, in response to the linear image information processed by the image processing means 12, the linear images of each original image are represented on a display such as CRT 62 as they are arranged in such a way that they will come out correctly when viewed from the lenticular sheet C side, and the displayed image is recorded on the lenticular recording material F from the rear side.

The recording apparatus 60 shown in FIG. 8 only differs from the recording apparatus 10 in that a display is used as an image forming means and that the image displayed on it is recorded on the rear side of the lenticular recording material F; since the image processing means 12 and other components of the apparatus 60 have the same construction as with the apparatus 10, the components that are the same as those shown in FIG. 1 are identified by like numerals and will not be described in detail.

In the recording apparatus 60, the reading unit 12 outputs information on the linear images of original images a–d as they are arranged in a predetermined order. The information is then sent to a display control circuit 64 and processed as R, G and B signals to be displayed on the CRT 62. The image signals R, G and B are sent to the CRT 62, which displays the corresponding images on the screen 66 by scanning.

The image displayed on the screen 66 is a composite of the linear images of the respective original images that are sequenced in such a way that those linear images which are formed on the lenticular recording material F will come out correctly when they are viewed from the lenticular sheet C side. Hence, the linear images of the respective original images are arranged sequentially in a predetermined order as in the case shown in FIG. 3 (i.e., $a_1$, $b_1$, $c_1$, $d_1$, $a_2$, $b_2$, $c_2$, $d_2$, $a_3$, ... ); in other words, the sequence of linear images is the same as that of the images recorded on the lenticular recording material F in the recording apparatus 10 shown in FIG. 1 (except that the sequence is reversed right and left in a case like the embodiment shown in FIG. 8 where direct recording is made using only one imaging lens 68 which is to be described below).

The image displayed on the CRT 62 is projected through the imaging lens 68 onto the rear side of the lenticular recording material E and focused on the recording layer D, whereby said recording layer D is exposed to have a stereoscopic image recorded on the lenticular recording material F.

The embodiment under consideration has the advantage that if the size of the display such as CRT is increased and if the image displayed on it is reduced for recording on the lenticular recording material F, it is possible to record a stereoscopic image of high quality in high resolution.

The method of exposing the lenticular recording material F is in no way limited to the projection through the imaging lens 68. If desired, the image displayed on CRT 62 may be directly used to expose the lenticular recording material F.

In a preferred embodiment, a means of adjusting the size of displayed image may be provided for the display such as CRT so that it is adaptable to the size of the lenticular recording material F.

With the recording apparatus 60 according to the second embodiment of the present invention, it is necessary to perform registration so that the displayed linear images will correspond to the pitch P of the lenticular lenses in the lenticular recording material F. An exemplary method of registration comprises first checking the positions of the displayed images and the lenticular recording material F by the same method as adopted by the registration means 16 (see FIG. 1) and then adjusting the positions of the images on the display.

The recording apparatus 10, 11 and 60 of the present invention which have been described on the foregoing pages are such that the image processing means 12 is positioned side by side the image forming means 14 and other components within the same housing; however, this is not the sole case of the present invention and the image processing means 12 may be placed in a separate housing from the image forming means 14 or, alternatively, the reading unit 18 alone may be placed in a separate housing, so that the image information delivered from the image processing means 12 is stored in a recording medium such as a floppy disk or an optical disk, from which the information on the linear images of original images is supplied to the image forming means.

There is no particular need for the image processing means 12 to contain the reading unit 18 and instead of incorporating the unit, a computer, a recording medium such as floppy disk, a separate reading unit such as scanner, etc. may be used to produce information on the original images.

As described fully on the foregoing pages, the method and apparatus of the present invention for recording a stereoscopic image records stereoscopic image from the rear side of a lenticular recording material. Therefore, as shown in FIG. 9, the lenticular recording material of the present invention which is to be used with said method and apparatus has the recording layer D provided on the rear side of the lenticular sheet C, with anti-halation layer AH being provided between the lenticular sheet C and the recording layer D.

With ordinary lenticular recording materials, image exposure (printing) is done via the lenticular sheet and, therefore, an anti-halation layer which serves to prevent random reflection of the exposing light that has passed through the recording layer is formed on the rear side of the lenticular recording material. In contrast, the recording of a stereoscopic image in the present invention is effected from the rear side of the lenticular recording material F as shown in FIG. 3; hence, the lenticular recording material F of the present invention has the anti-halation layer AH formed between the lenticular sheet C and the recording layer D composed of R-, G- and B-sensitive layers. The anti-halation layer AH is not limited in any particular way and various known anti-halation layers can be used.

The recording layer of the lenticular recording material is composed of light-sensitive layers that correspond to R, G and B colors and, in the embodiment under consideration, these sensitive layers are preferably arranged in reverse order to the ordinary arrangement adopted by the recording layer D. An advantageous example of such arrangement is shown in FIG. 9 and comprises B-, G- and R-sensitive layers which are formed in that order, with the B-sensitive layer being closest to the surface. Another preferred example is the arrangement of G-, B- and R-sensitive layers which are formed in that order, with the G-sensitive layer being closest to the surface.

With the lenticular recording material F being composed in the manner described above, a satisfactory stereoscopic image can be recorded from the rear side without causing any blur due to halation. Furthermore, exposure is performed directly on the recording layer D without letting the exposing light pass through the lenticular sheet C and, hence, in the absence of reflection and absorption of the light beam by the lenticular sheet C, sharp and clear image recording is possible, thus enabling the recording of natural and high-quality image.

In addition, the recording apparatus of the present invention performs recording (exposure) on the rear side of the lenticular recording material without letting the exposing light pass through the lenticular sheet C and, hence, there is no need to worry about the adverse effects that might be caused by the lenticular sheet C, such as absorption and reflection of the light beam. Therefore, the lenticular sheet C may be made of various known materials that include not only highly transparent plastics such as PET (polyethylene terephthalate), PC (polycarbonate) and polypropylene but also less transparent and yet inexpensive PVC (polyvinyl chloride).

The process for producing the lenticular recording material F is in no way limited. According to one possible method, an anti-halation layer AH is coated or otherwise formed on the lenticular sheet C serving as a base layer and a recording layer composed of R-, G- and B-sensitive layers is formed in the same manner as adopted for producing ordinary recording materials. Alternatively, an anti-halation layer AH is first formed on the lenticular sheet C by the same method described above and, then, a variety of color recording materials may be bonded.

The lenticular recording material F, after a stereoscopic image has been recorded from the rear side, is then subjected to a suitable development depending upon the species of the recording material light-sensitive layers) used, thereby producing a complete stereoscopic image on the lenticular sheet C.

After the end of image recording and before and/or after development, a white layer made of titanium oxide or the like, various protective layers, etc. may optionally be formed on the rear surface of the lenticular recording material F.

While the method and apparatus for recording a stereoscopic image according to the first and fourth aspects, respectively, of the present invention, as well as the lenticular recording material according to the seventh aspect have been described above in detail, it should be noted that the invention is by no means limited to the embodiments described above and that various modifications and alterations can of course be made without departing from the scope and spirit of the invention.

As described above in detail, the method of recording a stereoscopic image according to the first aspect of the present invention and the apparatus for recording a stereoscopic image according to the fourth aspect of the invention enable direct image recording on the lenticular recording material having a recording layer on the rear surface of a lenticular sheet; hence, there is no need to bond the recording material to the lenticular sheet in precise registry with each other after recording the image on the recording material, which work requires considerable labor and time; as a result, stereoscopic images can be recorded with an extremely high efficiency compared to the conventional apparatus for recording stereoscopic images by scanning exposure.

Furthermore, one can alter the thickness of linear images, the distance between linear images and even their density, etc. by electrical processing of image information and a simple adjustment of the optics and it is also easy to alter or adjust the image recording regions, image density, etc. As a result, there is insured great flexibility in adaptation for the performance of various image processing operations such as changing the magnification of image to be recorded and shading correction, alterations in the specifications of the lenticular sheet, and the changes in the size of image to be recorded. In addition, image deterioration such as uneven exposure due to the vignetting of lenticular lenses on the lenticular sheet can be effectively prevented.

The lenticular recording material according to the seventh aspect of the present invention which is used for implementing the aforementioned method and apparatus for recording stereoscopic images offers the advantage that even if image recording is done from the rear side, blurring due to halation can be prevented and yet a natural, high-quality stereoscopic image can be recorded.

In the next place, we will describe in detail a method for recording stereoscopic images according to the second aspect of the present invention and an apparatus for recording a stereoscopic image according to the fifth aspect of the present invention with reference being made to FIGS. 10–16.

According to these aspects, a lenticular recording sheet having both a lenticular sheet and a recording layer is subjected to scanning exposure, either from the rear side of the lenticular recording material (where the recording layer is provided) or from the front side with a light beam modulated in accordance with the linear images produced from a plurality of original images, whereby those linear images are recorded on the lenticular recording material to produce a complete stereoscopic image. By adjusting the recording width of linear images to be recorded on the recording layer, those linear images can be recorded, preferably without overlapping the image recording regions of the lenticular recording material, and without leaving any blank portions (gaps) and, as a result, stereoscopic images can be recorded in such a way that they will insure satisfactory stereoscopic vision at all times independently of external factors such as the position of viewer's eye.

In short, in accordance with the second and fifth aspects of the present invention, the recording width of linear images to be recorded is adjusted by the following means: i) an optical means by which the spot diameter of the light beam incident on the recording layer is adjusted in the slow scan direction to increase the width of linear images to be recorded, either by providing in the optical path of the light beam an optical member for adjusting the spot diameter of the light beam such as a beam expander (primarily in the case of rear exposure) or a cylindrical lens (for front exposure) or by adjusting the angle of incidence of the light beam on the lenticular sheet in the case of front exposure; ii) an image processing means that relies upon light beam scanning for adjusting the recording of linear images as by recording the same linear image several times within one pitch of lenticular lenses in the lenticular recording material (primarily in the case of rear exposure); and iii) the combination of the optical and image processing means (primarily in the case of front exposure).

Hence, according to the second and fifth aspects of the present invention, the linear images of original images to be recorded within one pitch of lenticular lenses in the lenticular recording material by scanning exposure can be adjusted advantageously to enable the recording of a stereoscopic image with the line width increased as much as in the case of recording a stereoscopic image with optics that relies upon projection of exposing light. As a result, stereoscopic images can be recorded in such a way that they will insure satisfactory stereoscopic vision at all times independently of external factors such as the position of viewer's eye.

What is more, information on a plurality of original images as obtained from different viewpoints is processed and the light beam modulated in accordance with the processed image information is used to perform scanning exposure for recording a stereoscopic image. Hence, unlike the case of optical recording of stereoscopic images which relies upon projection of exposing light, the optics of the apparatus for recording a stereoscopic image according to the present invention features a simple construction. Furthermore, one can alter the distance between linear images to be recorded and even their density by electrical processing of image information and a simple adjustment of the optics and it is also easy to alter or adjust the image recording regions, image density, etc. As a result, there is insured great flexibility in adaptation for the adjustment of the number of original images to be recorded, the performance of various image processing operations such as changing the magnification of image to be recorded and correction of shading, alterations in the specifications of the lenticular sheet, and the change in the size of image to be recorded.

Therefore, according to the second and fifth aspects of the present invention, there is insured an extremely high operational efficiency and, yet, stereoscopic images of high quality that conform to the specifications of the lenticular sheet used, the size of image to be recorded, etc. and which have been subjected to various image processing and line width increasing operations can be recorded with high degree of freedom.

On the pages that follow, the method of recording a stereoscopic image according to the second aspect of the present invention and the apparatus for recording a stereoscopic image according to the fifth aspect are described in detail with reference to the preferred embodiments shown in accompanying drawings.

Figure 10:
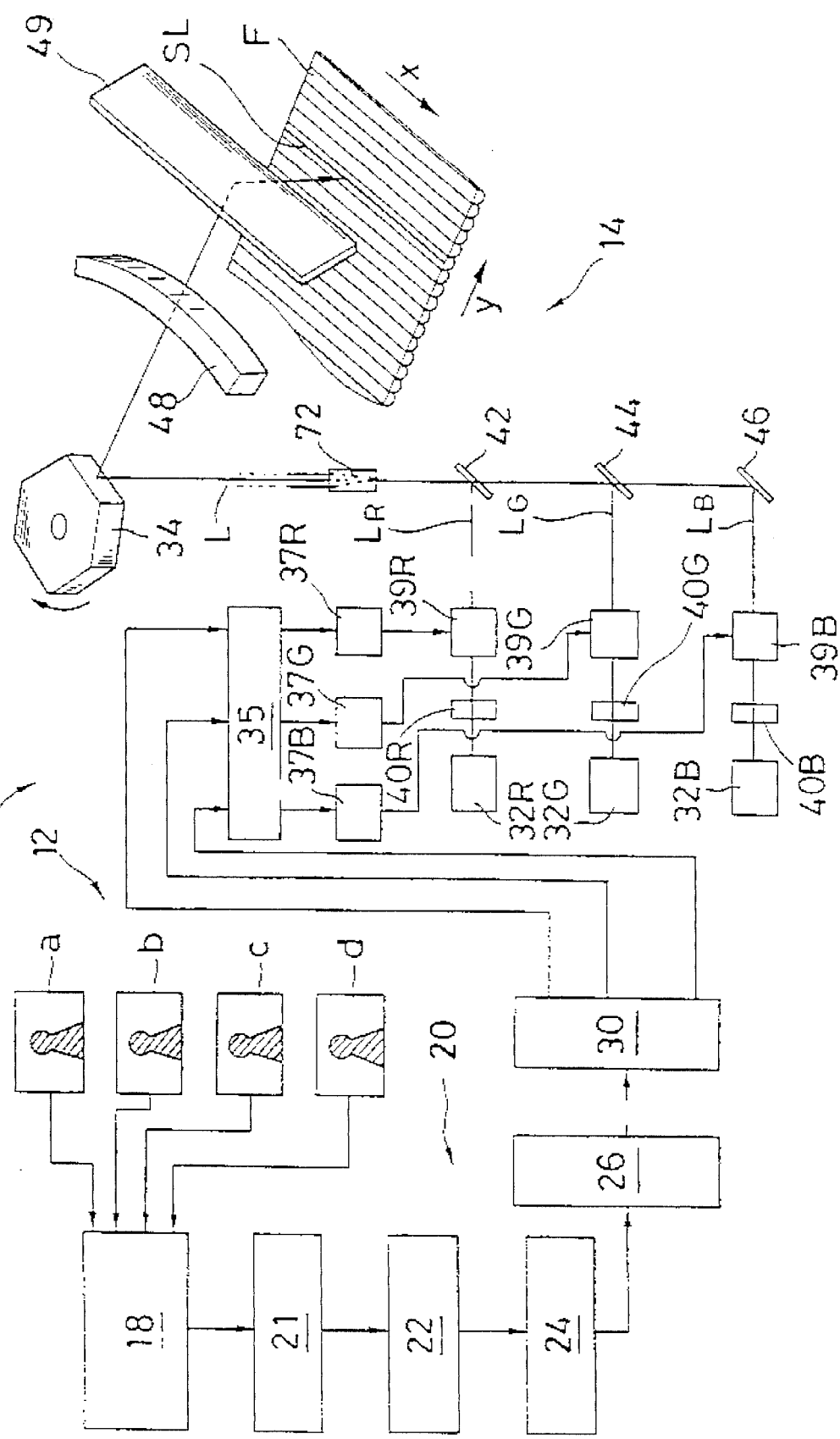
FIG. 10 is a diagram showing conceptually a stereoscopic image recording apparatus according to yet another embodiment of the present invention.
Figure 11:
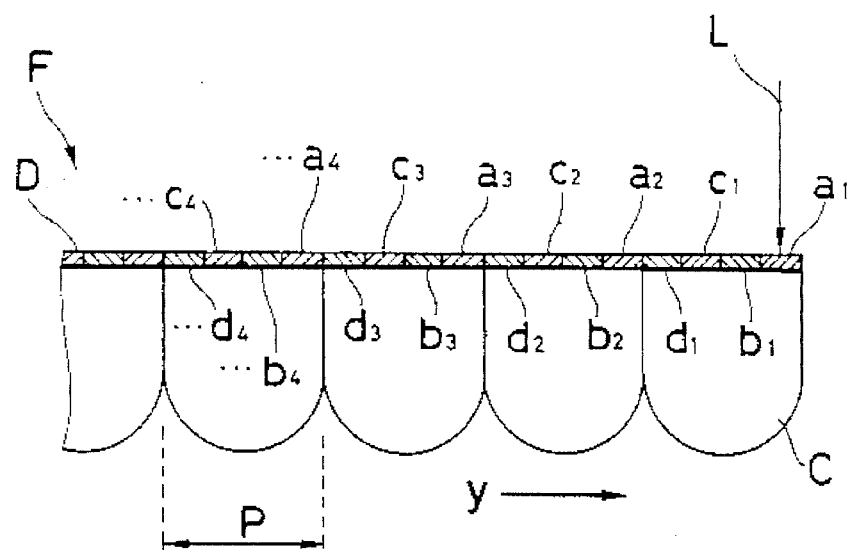
FIG. 11 is a diagram showing conceptually how linear images are recorded on a lenticular recording material with the stereoscopic image recording material shown in FIG. 10.
Figure 13:
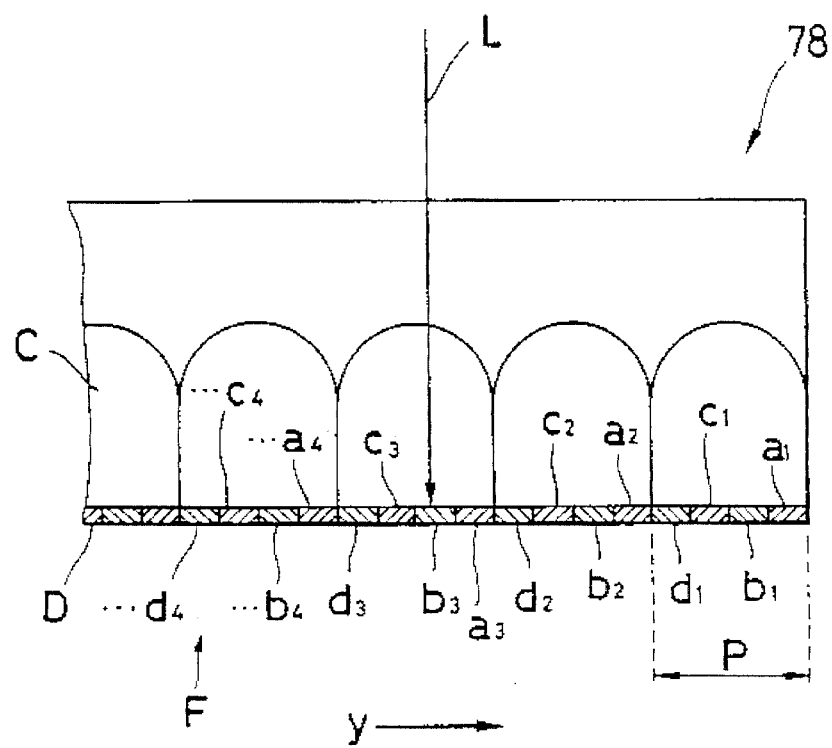
FIG. 13 is a diagram showing conceptually another example of the exposing method to be employed with the stereoscopic image recording apparatus shown in FIG. 10.

FIG. 10 shows conceptually an apparatus for recording a stereoscopic image according to an embodiment of the present invention. The apparatus for recording a stereoscopic image (hereunder referred to simply as the "recording apparatus") which is indicated by 70 in FIG. 10 reads a plurality of original images as obtained from different viewpoints by an imaging device such as a multi-lens camera and records a stereoscopic image on a lenticular recording material F by scan exposure from the rear side. In a preferred embodiment, the lenticular recording material has a recording layer D formed as an integral part of the rear surface of a lenticular sheet C.

The recording apparatus 70 shown in FIG. 10 is essentially the same as the recording apparatus 10 shown in FIG. 1 except on the following two points: it does not include registration means 16 but it includes a beam expander 72 that acts upon the light beam L. Therefore, the components that are identical to those which are shown in FIG. 1 are identified by like numerals and will not be described in detail.

The lenticular recording material F to be used with the recording apparatus 70 shown in FIG. 10 which performs exposure from the rear side of the material F has preferably an anti-halation layer formed between the lenticular sheet C and the recording layer D.

It should be noted here that the recording apparatus 70 shown in FIG. 10 is not solely applicable to the lenticular recording material F which is an integral assembly of the lenticular sheet C and the recording layer D. The apparatus is also applicable, with advantage, to the case where a recording material that has an image recorded thereon is bonded to a lenticular sheet so as to construct a lenticular recording material.

The recording apparatus 70 comprises basically the following components: an image processing means 12 that reads original images a–d photoelectrically and performs image processing of them to output image information that permits the completed stereoscopic image to come out correctly when it is viewed from the front side of the lenticular recording material F; and an image forming means 14 that deflects in the fast scan direction (as indicated by arrow x in FIG. 10) a light beam L modulated in accordance with the image information supplied from the image processing means 12, that transports the lenticular recording material F in the slow scan direction (as indicated by arrow y in FIG. 10) which is generally perpendicular to the fast scan direction, and that scans over the lenticular recording material F two-dimensionally by means of the light beam L from the rear side (where the recording layer C is provided) so that a stereoscopic image is recorded through scanning exposure.

In the optical path of the merged light beam L, there is provided the beam expander 72 as an adjusting means that adjusts the spot diameter of the light beam L, preferably in the slow scan direction alone, thereby adjusting the recording width of linear images to be recorded on the lenticular recording material F.

The image processing means 12 comprises a reading unit 18 for reading original images a–d and a linear image processing unit 20 with which the image information read by the unit 18 is processed to image information on the linear images to be recorded on the lenticular recording material F.

As already mentioned hereinabove, the reading unit 18 reads original images a–d photoelectrically by a solid-state imaging means such as a CCD camera, a CCD sensor or an image scanner and transfers them to the linear image processing unit 20 as color image information which consists of electric signals of the respective original images (the color image information may be associated with the three primary colors R, G and B).

The recording apparatus 70 shown in FIG. 10 is adapted for recording a stereoscopic image from the rear side of the lenticular recording material F. If the original images are read from the front side as in the case where they originate from a reflection document, they must be reversed inside out before recording. For this purpose, the reading unit 18 may be equipped with a means of reversing the original images inside out. It should be mentioned here that in the case where a lenticular sheet is bonded to the recording material after image recording has been effected on it, there is no need to provide the means of reversing the original images inside out since recording is eventually effected from the front side of the lenticular recording material.

The linear image processing unit 20 comprises a pre-image processor 21, a splitter 22, a sequencer 24 and an image processor 26. As already discussed hereinabove, the image information on the original images a–d that have been read by the reading unit 18 is subjected to various image processing operations in the pre-image processor 21 and thereafter sent to the splitter 22, where each original image is split into linear images to be recorded on the lenticular recording material. The linear images as formed for the respective original images are arranged by the sequencer 24 in the recording order and, after being subjected to image processing in accordance with the recording and other conditions set by the image processor 26, those linear images are sent to the image forming means.

To produce satisfactory stereoscopic vision, the recording apparatus 70 has the linear image processing unit 20, in which the width of linear images to be recorded on the recording layer D is adjusted for each original image and, preferably, the individual linear images are recorded in such a way that there will be no overlap between the linear images and that one pitch of lenticular lenses on the lenticular sheet will be completely filled by the recorded linear images without leaving any blank portions (gaps). To this end, the individual linear images may be formed with their widths being set to satisfy the equation $a_1+b_1+c_1+d_1=P$ (see FIG. 11).

Image processing operations to be performed by the image processing means 12, as exemplified by the formation of linear images, determination of their recording positions, determination of the times by which the same linear image should be recorded and processing into image information to be recorded on the lenticular recording material F, may be carried out in accordance with the adjustment of the recording width of the linear images.

The image forming means 14 deflects in the fast scan direction (x direction) the light beam modulated in accordance with the linear image information transferred from the linear image processing unit 20 and transports the lenticular recording material F in the slow scan direction (y direction) which is generally perpendicular to the fast scan direction, whereby the lenticular recording material F is scanned over two-dimensionally from the rear side so as to record a stereoscopic image. The image forming means 14 has a light beam issuing means by which the light beams LR, LG and LB modulated in accordance with the linear image information are merged into a single beam for issuing, and a light beam scanning means by which the lenticular recording material F is scanned over two-dimensionally with the merged light beam L.

The merged light beam L emitted by the issuing means is then launched into a beam expander 72 that increases the spot diameter of light beam L, preferably in the slow scan direction alone, thereby increasing the line width of linear images to be recorded on the recording layer D of the lenticular recording material F so as to eventually increase the recording width of the linear images.

As already pointed out hereinabove, one of the problems with the stereoscopic images produced on the lenticular sheet is that if many portions of the lenticular recording material remain blank (no linear images are recorded), the positions of the viewer's eyes in which he can attain stereoscopic vision are limited and, outside this narrow range, there occurs a sharp drop in the density and not only is the three-dimensional depth of the image impaired but it may also occur that the image sometimes becomes totally invisible depending on the positions of the two eyes.

The beam expander 72 in the recording apparatus 70 shown in FIG. 10 increases the spot diameter of the light beam L, thereby increasing the line width of linear images to be recorded with the light beam L so as to enable the recording a satisfactory stereoscopic image.

There is no particular limitation on the degree by which the beam expander 72 increases the spot diameter of light beam L and it may be determined as appropriate depending on the pitch P of lenticular lenses on the lenticular sheet C. Preferably, the spot diameter of light beam L is increased in such a way that there will be no overlap between respective linear images and that they can be recorded within one pitch leaving no gaps therebetween; for example, the spot diameter of light beam L may be increased to insure that linear images $a_1$, $b_1$, $c_1$ and $d_1$ can be recorded in a way that satisfies the equation $a_1+b_1+c_1+d_1=P$ (see FIG. 11). The beam expander 72 may be designed to be capable of increasing the spot diameter of light beam L in variable degrees.

The means of increasing the spot diameter of light beam L is in no way limited to the use of a beam expander as in the case shown in FIG. 10. Any known methods of adjusting the spot diameter of light beam can be used, as exemplified by a method in which the light beam L is allowed to be incident at an angle to the lenticular recording material so that it will form an elliptic spot on the recording layer D, with the spot diameter being increased in the slow scan direction.

It should be noted here that if a beam expander is used as the shaping means 40, the beam spot diameter increasing means such as beam expander 72 may be omitted.

The light beam as adjusted for the spot diameter by means of the beam expander 72 is then incident on the polygonal mirror 34 working as a light deflector and is deflected in the fast scan direction (as indicated by arrow x in FIG. 10).

Thus, the beam expander 72 in the recording apparatus 70 increases the spot diameter of light beam L so as to increase advantageously the line width of linear images to be recorded. Consequently, a satisfactory stereoscopic image can be recorded without leaving any gaps between adjacent linear images.

In the case described above, the beam expander 72 is used to increase the line width of linear images to be recorded, thereby increasing the recording width of linear images. However, this is not the sole case of the present invention and various image processing approaches to be performed by the linear image processing unit 20, such as recording linear images repeatedly or adjusting the width of linear images to be formed, may be taken to adjust the width of linear images for the respective original images so that the linear images will be recorded leaving no gaps therebetween.

Take, for example, the case where $a_1+b_1+c_1+d_1=P/2$; in this case, the recording width of individual linear images can be increased so that they are recorded leaving no gaps therebetween by adopting a suitable method such as recording the respective linear images, with each image repeated twice, to produce the sequence of $a_1, a_1, b_1, b_1, c_1, c_1, d_1$ and $d_1$ within one pitch.

Alternatively, the linear images may be formed in compliance with the pitch P of lenticular lenses on the lenticular sheet so as to record those linear images without causing any gaps therebetween.

The methods described above may of course be employed in combination; if desired, those image processing approaches may be combined with optical approaches already exemplified as the use of a beam expander.

In accordance with the set values of recording conditions such as the number of linear images formed (or the number of read/scan lines) n, the pitch P of lenticular lenses on the lenticular sheet C, the recording magnification m (which may be set on the basis of the sizes of original images and the recorded image), the number of original images o, and the beam spot diameter d of light beam L, the total number of lenticular lenses N, recording specifications such as the number of pitches α on which the same linear image is to be repeated and the number of repetitions of a linear image within pitch β are set. Five examples of the specifications for recording a stereoscopic image in accordance with various combinations of recording conditions as adopted by the recording apparatus 70 of the present invention are shown in Table 2 below. The examples shown in Table 2 refer to the case where the read/scan lines for the respective original images are used straightforwardly as linear images.

TABLE 2

|  | Ex. 4 | Ex. 5 | Ex. 6 | Ex. 7 | Ex. 8 |
| --- | --- | --- | --- | --- | --- |
| Number of original images, o | 4 | 4 | 4 | 2 | 2 |
| Width of original image, w | 15 | 15 | 15 | 15 | 15 |
| Number of read/scan lines (linear images), n | 1000 | 500 | 1000 | 2000 | 2000 |
| Recording magnification, m = W/w | 6.7 | 6.7 | 20 | 6.7 | 6.7 |
| Recording width of stereoscopic image, W | 100 | 100 | 300 | 100 | 100 |
| Pitch of lenticular sheet, P | 0.1 | 0.1 | 0.2 | 0.1 | 0.1 |
| Total number of lenticules used, N = W/P | 1000 | 1000 | 1500 | 1000 | 1000 |
| Maximum width of linear image, D = P/o | 0.025 | 0.025 | 0.05 | 0.05 | 0.05 |
| Beam spot diameter, d | 0.025 | 0.025 | 0.025 | 0.05 | 0.025 |
| Number of pitches on which the same linear image is repeated, α | 1 | 2 | 1.5 | ½ | ½ |
| Number of repetitions of a linear image within pitch, β | 1 | 1 | 2 | 1 | 2 |

Referring to Table 2, the term "the total number of lenticules used, N" means the number of pitches or lenticular lenses in the lenticular sheet that can be used for recording a stereoscopic image, "the number of pitches on which the same linear image is repeated, α" means the number of pitches on which the same linear image is recorded, and "the number of repetitions of a linear image within pitch, β" means the number of times by which the same linear image is recorded within a pitch.

As Table 2 shows, if the maximum width of linear image D is equal to the beam spot diameter d (including the case where it is increased by means of beam expander 72) and if the total number of lenticules used, N (=W/P), is equal to the total number of linear images n (as in Example 4), linear images are recorded, one per pitch of the lenticular sheet. If n is smaller than N (Example 5), the same linear image is recorded repetitively on more than one pitch (two pitches in Example 5). If n is greater than N (as in Example 7), linear images are subsampled (1/2 in Example 7) for recording.

If n is smaller than N and if d is smaller than D (as in Example 6), the same linear image is recorded more than once within one pitch and, furthermore, it is recorded on more than one pitch. If n is greater than N and if d is smaller than D (as in Example 8), the same linear image is recorded more than once within one pitch and, furthermore, linear images are subsampled for recording as in Example 7.

With the recording apparatus 70 of the present invention, the recording width of linear images need not be the same for all original images to be recorded and the width of certain linear images may be adjusted depending on the need, as exemplified by increasing the recording width of the linear images to be recorded in the center of the pitch (in the case shown in FIG. 1, the linear images of original images b and c are in the center of the pitch). If desired, the recording apparatus may be so adapted that the recording widths of linear images for the respective original images can be adjusted automatically in accordance with various factors such as the kind and number of original images to be recorded and the specifications of the lenticular sheet C.

Further, the width of linear images also need not be the same for a given original image and it may properly be adjusted depending on the need so as to produce a stereoscopic image in which the width of linear images at both ends differs from the width in the central portion.

Figure 12:
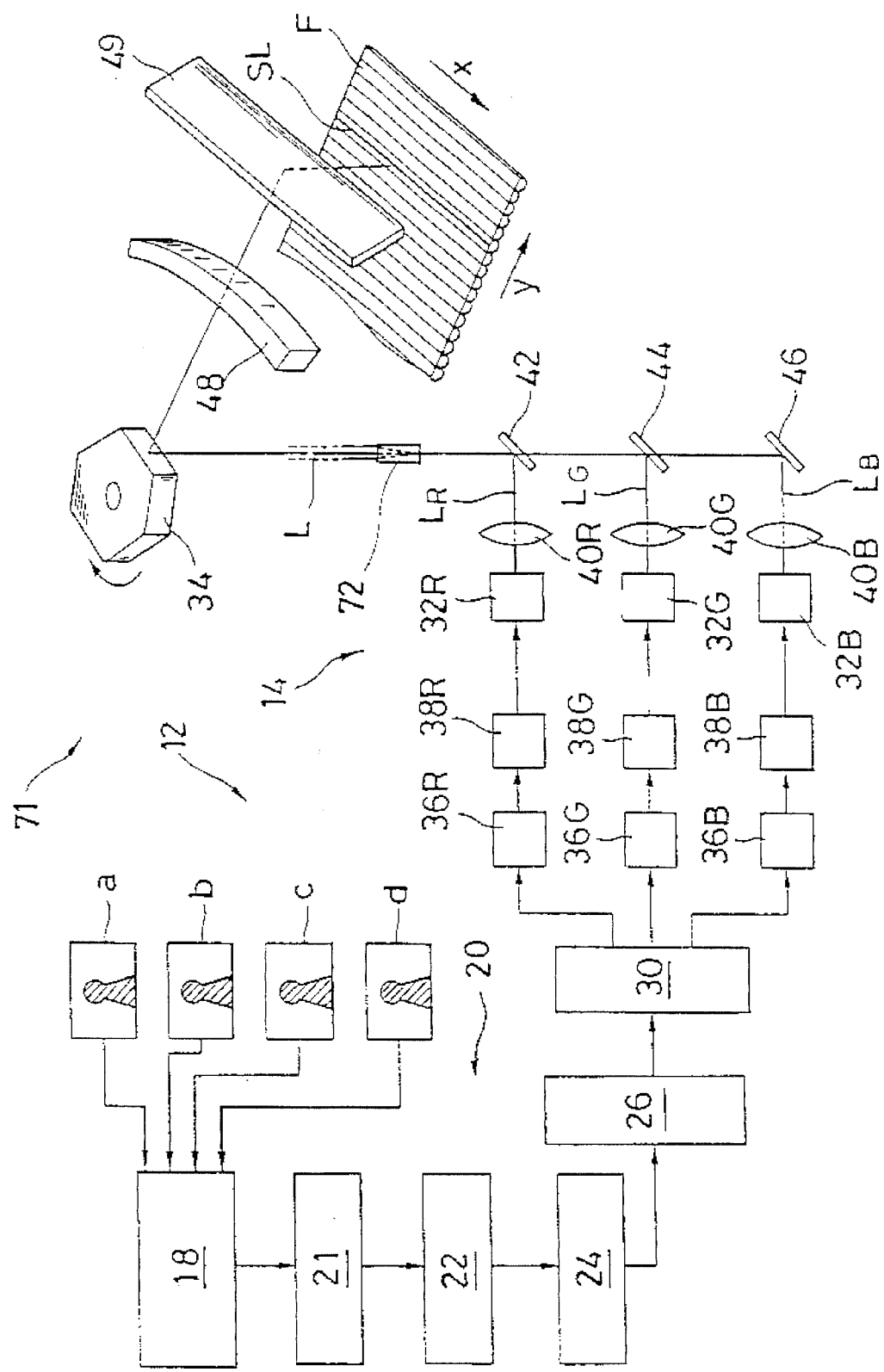
FIG. 12 is a diagram showing conceptually a stereoscopic image recording apparatus according to yet another embodiment of the present invention.

The recording apparatus 70 according to the fifth aspect of the present invention which is shown in FIG. 10 uses an optical modulator such as AOM 39 modulate light beams; however, as in the fourth aspect already described above, this is not the sole case of the present invention and the same result can be attained by pulse width modulation of light emission from the light sources 32 as shown in FIG. 12, or by intensity modulation of the light sources 32.

In the embodiments shown in FIGS. 10 and 12, scan exposure is effected from the rear side of the lenticular recording material. Alternatively, an additional lenticular sheet 78 (see FIG. 13) that comprises lenses arranged in a way to cancel the refractive power of the lenticular lenses may be placed on top of the lenticular sheet C so that scan exposure is effected from the front side of the lenticular recording material.

With the recording apparatus according to the fifth aspect of the present invention, the width of linear images is adjusted or repetitive recording or the like is performed to adjust the recording width of linear images, preferably leaving no gaps between individual linear images; therefore, the smaller the deviation of scan line SL from the generatrix of the lenticular sheet C, the better.

Furthermore, with the recording apparatus according to the fifth embodiment, the width of linear images is adjusted or repetitive recording or the like is performed to adjust the recording width of linear images for each original image, preferably leaving no gaps between individual linear images; therefore, it is important to accomplish exact registration. To this end, it is preferred that as in the fourth aspect of the present invention already described hereinabove, the recording apparatus according to the aspect under consideration includes a means of achieving registration for image recording on the lenticular recording material F as indicated by reference numeral 16 in FIG. 1.

With the recording apparatus of the present invention described on previous pages, the recording of a stereoscopic image (or linear images) is effected either from the rear side of the lenticular recording material or from the front side using additional lenticular sheet 78 or, alternatively, the lenticular sheet C is bonded to the recording material after linear images have been recorded on it. However, the present invention is in no way limited to these cases alone and linear images may be recorded directly from the front side of the lenticular recording material, namely, with the exposing light being passed through the lenticular sheet C.

Figure 14:
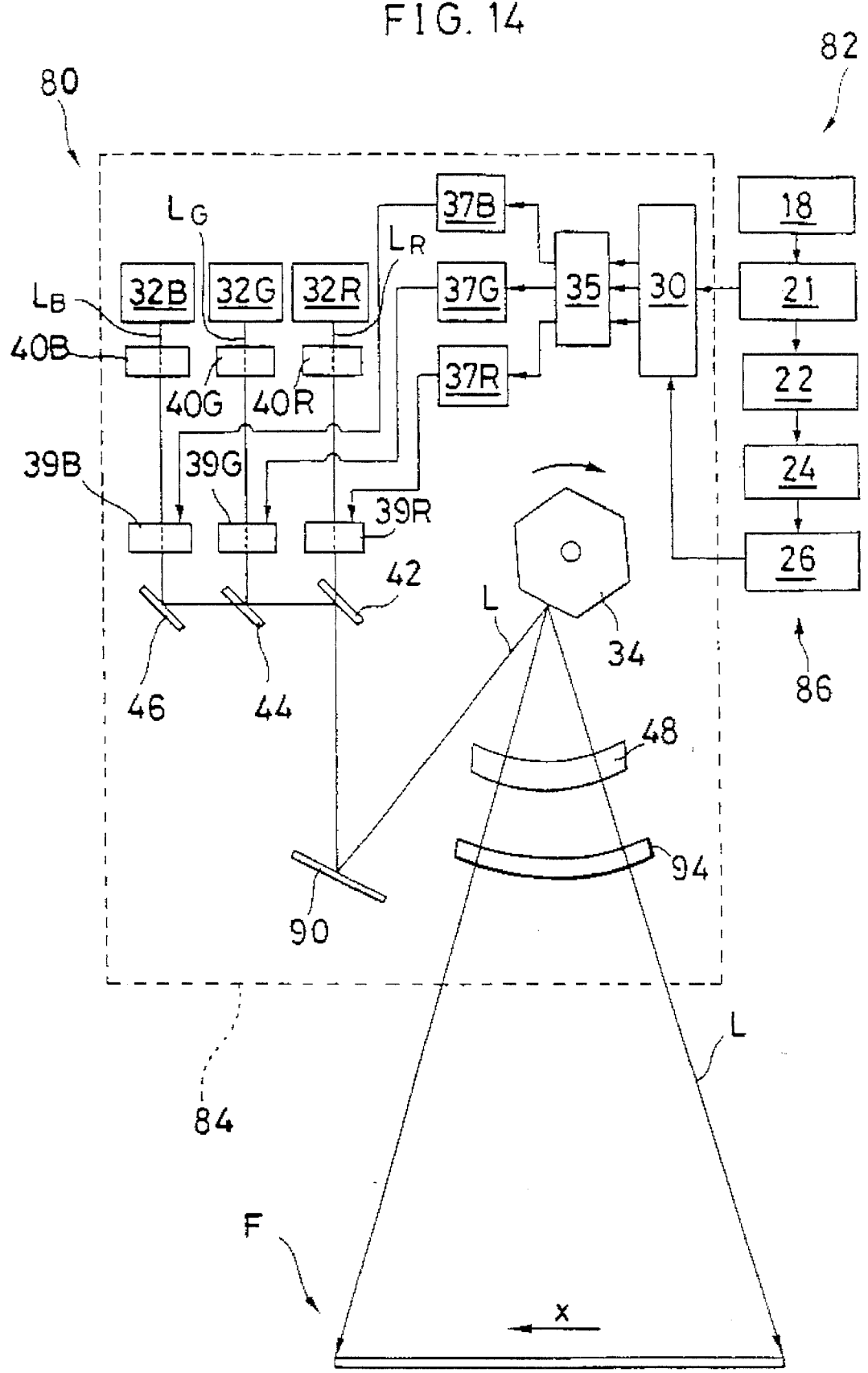
FIG. 14 is a diagram showing conceptually a stereoscopic image recording apparatus, as seen in the slow scanning direction, according to still another embodiment of the present invention.

An example of the recording apparatus of the present invention which performs "front exposure" is shown conceptually in FIG. 14 as it is seen in the slow scan direction. The recording apparatus generally indicated by 80 in FIG. 14 has a similar construction to the recording apparatus 70 shown in FIG. 10 and the components or members that are the same as those which are shown in FIG. 10 are identified by like numerals and will not be described in detail. The following description concerns the case of recording a stereoscopic image as constructed from four original images a, b, c and d but, needless to say, this is not the sole case of the present invention. It should also be noted that since the recording apparatus 80 performs front exposure, the lenticular recording material F is of the usual type having an anti-halation layer on the rear surface of the recording layer D.

The recording apparatus 80 shown in FIG. 14 comprises basically an image processing means 82 and an image forming means having scanning optics 84, a unit (not shown) for transporting the lenticular recording material F in the slow scan direction and a mechanism for moving the scanning optics 84. As in the case of recording apparatus 70, the apparatus 80 deflects in the fast scan direction (as indicated by arrow x in FIG. 14) the light beam L produced by merging the three beams LR, LG and LB modulated in accordance with the image (linear images) to be recorded, and transports the lenticular recording material F in the slow scan direction (normal to the paper) which is generally perpendicular to the fast scan direction, whereby a stereoscopic image is recorded on the lenticular recording material F.

With the recording apparatus 80, original images a–d are read by the reading unit 18 in the image processing means 82 and the image information readout is then transferred to a linear image processing unit 86. The linear image processing unit 86 has basically the same construction as the linear image processing unit 20 in the aforementioned recording apparatus 70. It comprises: a pre-image processor 21 which performs any necessary image processing operations, such as density adjustment and sharpness correction, on the image information on the original images a–d; a splitter 22 which splits each original image to form linear images (see FIG. 2); a sequencer 24 which sets the positions where the linear images of the respective original images are to be recorded on the lenticular recording Material F in such a way that the completed stereoscopic image will come out correctly when it is viewed from the front side of the lenticular recording material F; and an image processor 26 which sets the interval at which linear images are recorded (sequenced), their width, image recording regions, etc. in accordance with the specifications of the lenticular sheet C used and the recording conditions such as the magnification for image recording. The image information on the recording of stereoscopic image is transferred from the linear image processing unit 86 to the scanning optics 84.

Since the recording apparatus 80 shown in FIG. 14 performs image recording from the front side of the lenticular recording material F, with the exposing light passing through the lenticular sheet C, the angle of light beam L incident on the lenticular sheet C must be altered for each of the original images to be recorded. Furthermore, in the case shown, the angle of light beam L is adjusted by moving the scanning optics 84. Under the circumstances, the recording apparatus 80 does not record the linear images of the four original images on a line sequential basis to produce the sequence $a_1, b_1, c_1, d_1, a_2, b_2, \ldots$ as effected by the recording apparatus 70; instead, the linear images are recorded in the above-described "skip scan" mode where the sequence of reading and recording steps is repeated for every one of the four original images; in one example, the linear images of original image a ($a_1, a_2, a_3, a_4, \ldots$) are recorded in predetermined positions and, thereafter, the scanning optics 84 is moved to adjust the angle of incidence of light beam L and the linear images of original image b ($b_1, b_2, \ldots$) are recorded; similarly, the linear images of original image c ($c_1, c_2, \ldots$) and those of original image d ($d_1, d_2, \ldots$) are recorded sequentially.

Therefore, the linear image information is transferred from the linear image processing unit 86 to the scanning optics 84 in the order corresponding to the order of recording the linear images; if the linear images are to be recorded in the order of a, b, c and d in terms of the original image, image information on the linear images of the original image a ($a_1, a_2, a_3, a_4, \ldots$) is first transferred to the scanning optics and, thereafter, the linear images of original image b, those of original image c and those of original image d are transferred in a similar manner. Hence, the efficiency of recording a stereoscopic image with the recording apparatus 80 will not differ greatly whether a plurality of original images are read at a time or sequentially (one image at a time). It should also be noted that the order of recording the linear images of the respective original images is in no way limited to the case described above.

The scanning optics 84 comprises a light beam issuing means, merging optics, a light deflector, etc. that are accommodated within a housing 88 (see FIG. 15); it is adapted to be movable on a circumference by the moving mechanism, so that the angle of incidence of light beam L on the lenticular recording material F is adjusted in a direction parallel to the curvature of lenticules on the lenticular sheet.

The linear image information transferred from the linear image processing unit 86 to the scanning optics 84 is processed in the same manner as it is processed in the recording apparatus 70; first, it is sent to the exposure control circuit 30, which calculates the amount of exposure for each of the pixels in one line for the three primary colors R, G and B, thereby determining the amount of exposure for each of the pixels in one line for the respective light sources 32 (32R, 32G and 32B); thereafter, the image information is sent to AOMs 39 (39R, 39G and 39B).

The light beams LR, LG and LB emitted from the associated light sources 32 have their beam spot diameter and other parameters adjusted by shaping means 40 (40R, 40G and 40B) that are provided in association with the respective light beams. Thereafter, the light beams have their intensity modulated by AOMs 39 in accordance with the image to be recorded and are subsequently merged into a single beam by means of the merging optics which is described below.

As with the recording apparatus 70, the sources of light beams to be used with the recording apparatus 80 are not limited in any particular way and various known light beam sources can be used, including gas lasers such as He—Ne laser, semiconductor lasers, a variety of solid-state lasers and light valves. Furthermore, besides the use of an optical modulator such as AOM, other methods of light beam modulation may be employed for image recording, as exemplified by pulse width modulation (see FIG. 12) or electrical intensity modulation of the light sources 32 per se.

The light beams modulated by AOMs 39 are merged into a single light beam L by means of the merging optics that is composed of two dichroic mirrors 42 and 44 and a single mirror 46. The single beam is reflected by a reflector mirror 90 in a predetermined direction to be incident on the polygonal mirror 34.

The light beam deflected by the polygonal mirror 34 in the fast scan direction (as indicated by arrow x in FIG. 14) is adjusted by the fθ lens 48 so that it will be focused as a beam spot of a predetermined diameter in a predetermined position on the recording layer D of the lenticular recording material F; thereafter, the light beam L to be incident on the recording layer D is launched into a cylindrical lens 94 that increases the spot diameter of that beam in the slow scan direction, thereby increasing the line width of linear images to be recorded.

The recording apparatus 80 shown in FIG. 14 is of such a type that linear images are recorded by front exposure, with the exposing light passing through the lenticular sheet C. Therefore, if the light beam L is just a parallel beam that has the spot diameter increased by a beam expander as in the case of the aforementioned recording apparatus 70, the light beam L passing through the lenticular sheet C will focus on the recording layer and there is no way to increase the width of scan line defined by the light beam L.

The cylindrical lens 94 is a lens that has refractive power only in the slow scan direction. The light beam L, as it passes through this cylindrical lens, has its spot diameter increased progressively in the slow scan direction, whereby the width of light beam passing through the lenticular sheet C to be incident on the recording layer D is increased and, hence, the width of scan line defined by the light beam L is increased to thicken the line width of linear images, thus making it possible to record a satisfactory stereoscopic image.

As in the case of the recording apparatus 70, the degree by which the spot diameter of light beam L is increased by the cylindrical lens 94 depends on various factors such as the pitch P of lenticules on the lenticular sheet C and is not limited in any particular way. Preferably, the spot diameter of the light beam L is increased in such a way that there is no overlap between individual linear images and that linear images can be recorded within one pitch leaving no gaps therebetween; an example of this preferred approach is to insure that the sum of the width of linear images $a_1$, $b_1$, $c_1$ and $d_1$ is equal to one pitch $(a_1+b_1+c_1+d_1=P)$.

It is also preferred that the cylindrical lens 94 is designed as a zoom lens which is capable of increasing the spot diameter of light beam L by varying degree that is adjustable in accordance with various factors such as the specifications of the lenticular sheet C and the conditions of recording linear images.

The position in which the cylindrical lens 94 should be provided is not limited in any particular way; however, for the reason of compactness, the cylindrical lens is preferably positioned right after the fθ lens 48 in the direction of travel of the light beam; on the other hand, for the reason of economy of the fθ lens, the cylindrical lens is preferably positioned near the lenticular recording material. Therefore, the position of the cylindrical lens 94 may be determined as appropriate by the size of image to be recorded and the cost of equipment.

The means of increasing the Spot diameter of the light beam L progressively is in no way limited to the cylindrical lens 94 shown in FIG. 14 and any of the known means of adjusting the spot diameter of light beam may be applied without limits. The aforementioned additional lenticular sheet 78 may well be considered to be an example of such adjusting means.

The light beam L passing through the cylindrical lens 94 issues out of the scanning optics 84 through a slit (not shown) formed in the wall of the housing 88; the issuing light beam is incident on the lenticular sheet C of the lenticular recording material F so as to focus on the recording layer D.

The lenticular recording material F is transported in the slow scan direction (normal to the paper of FIG. 14 and indicated by arrow y in FIG. 15) which is generally perpendicular to the fast scan direction; hence, the light beam L being deflected in the fast scan direction will eventually scan over the lenticular recording material F two-dimensionally. As in the case of the recording apparatus 70, the means of transporting the lenticular recording material F in the slow scan direction is not limited in any particular way and various known transport mechanisms may be employed, as exemplified by transport with rollers or an exposure mount.

Figure 15:
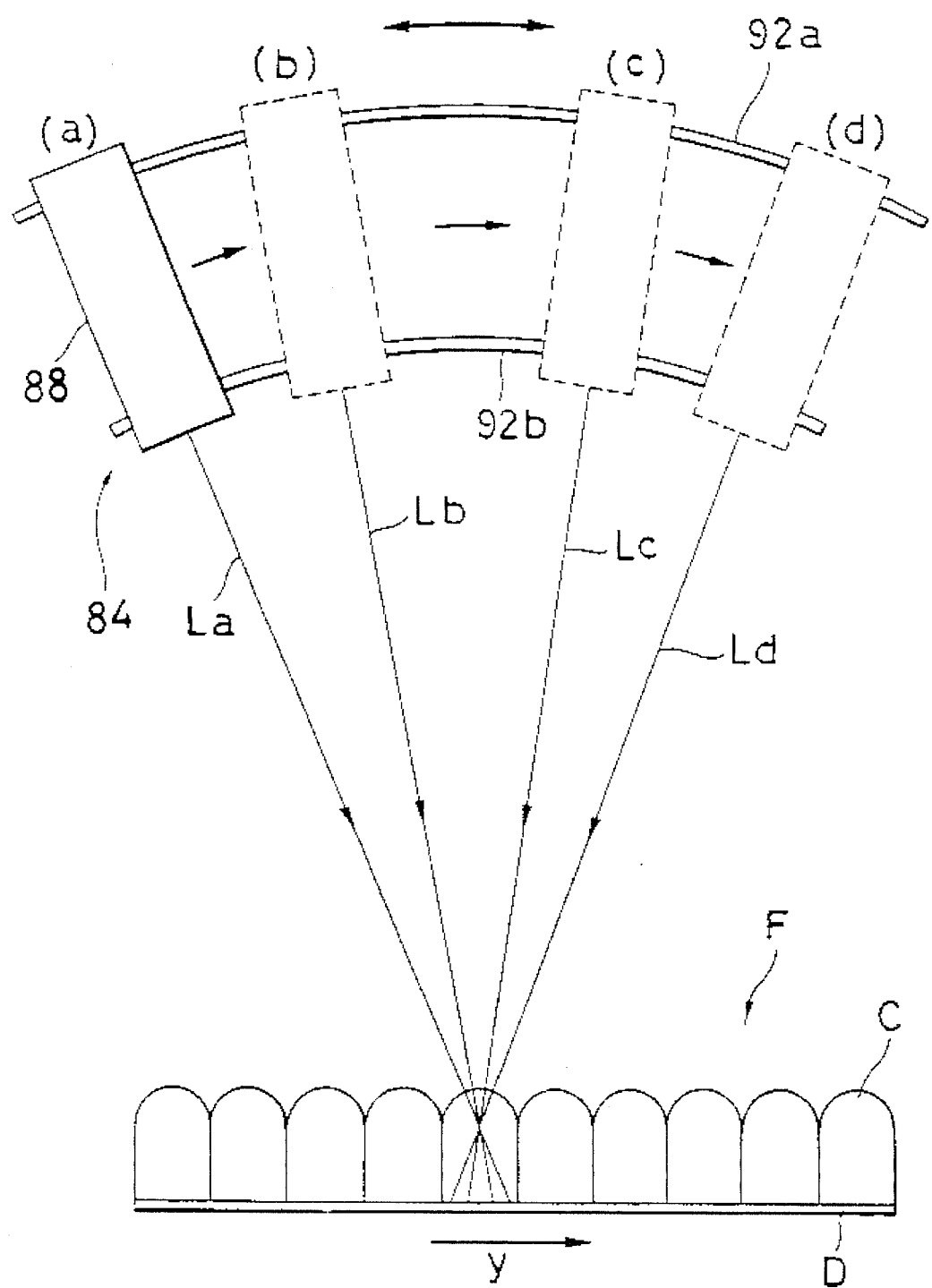
FIG. 15 is a diagram showing conceptually the stereoscopic image recording apparatus, as seen in the fast scanning direction, that is shown in FIG. 14.

FIG. 15 is a diagram showing conceptually the recording apparatus 80 as seen in the fast scan direction. The recording apparatus 80 records a stereoscopic image with the light beam L being launched from the front side of the lenticular recording material F to pass through the lenticular sheet C. Therefore, with the curvature of lenticular lenses on the lenticular sheet C being taken into account, the angle of incidence of the light beam L on the lenticular recording material F must be adjusted in the direction of curvature of lenticular lenses on the lenticular sheet C (hereinafter, this direction will be meant by the "angle of incidence of the light beam L") in accordance with the positions at which the linear images of the respective original images are to be recorded within one pitch P.

With the recording apparatus 80, the angle of incidence of the light beam L is adjusted by moving the scanning optics 84 in a circumferential direction as shown in FIG. 15.

In the case shown in FIG. 15, the housing 88 of the scanning optics 84 in the recording apparatus 80 has a drive unit (not shown) provided on the other side of the paper of FIG. 15 and it combines with guide rails 92a and 92b to compose the means of moving the scanning optics. The scanning optics 84 is adapted to be movable in a circumferential direction (as indicated by arrow z) and this renders the angle of incidence of the light beam L on the lenticular recording material F to be adjustable without changing the optical path length of the light beam L.

Figure 16:
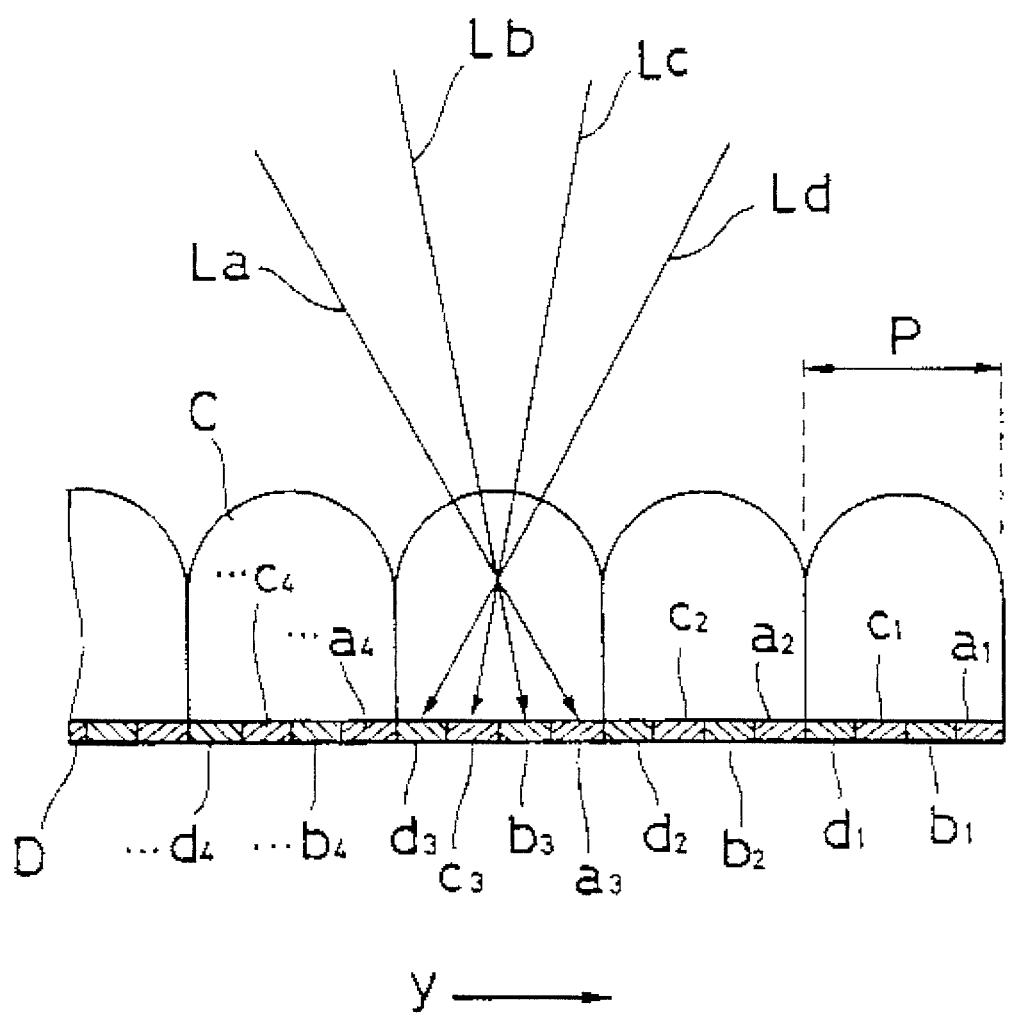
FIG. 16 is a diagram showing conceptually how linear images are recorded on a lenticular recording material with the stereoscopic image recording apparatus shown in FIG. 14.

Consider the case of recording linear images as shown in FIG. 16, with the order of the original images for the linear images being a→b→c→d. The process starts with setting the scanning optics 84 in the position indicated by (a) in FIG. 15; then, the light beam La which has been modulated in accordance with the linear image information on the original image a is launched into the lenticular sheet C at a predetermined angle of incidence that depends on the conditions of shooting the original image a and the curvature of the lenticular sheet C, as shown in FIGS. 15 and 16; with the lenticular recording material F being transported in the slow scan direction (as indicated by y), the linear images of the original image a are recorded, one each at a predetermined position within one pitch P, in the order of $a_1, a_2, a_3, a_4, \ldots$ (see FIG. 16).

In the next place, the lenticular recording material F is returned to the start point of image recording and, at the same time, the scanning optics 84 is moved to the position indicated by (b) in FIG. 15; as the lenticular recording material F is transported in the slow scan direction, the light beam Lb modulated in accordance with the linear images of the original image b is launched into the lenticular sheet C at a predetermined angle of incidence that depends on such factors as the conditions of shooting the original image b, whereby the linear images of the original image b are recorded sequentially in the order of $b_1, b_2, \ldots$ as shown in FIG. 16.

When the recording of the linear images of the original image b ends, the scanning optics 88 is moved to the position indicated by (c) in FIG. 15 and as the lenticular recording material F is transported in the slow scan direction from the recording start point, the linear images of the original image c are sequentially recorded with the light beam Lc in the order of $c_1, c_2, \ldots$ In the final stage, the scanning optics 84 is moved to the position indicated by (d) in FIG. 15 and, in a manner similar to that described above, the linear images of the original image d are recorded sequentially in the order of $d_1, d_2, \ldots$ by exposure to the light beam Ld which has been modulated in accordance with the linear image information for the original image d.

Thus, the recording apparatus 80 performs a total of four transports in the slow scan direction to record a complete stereoscopic image. As already mentioned, the linear images thus recorded have their line width increased by the light beam L which has its spot diameter increased in the slow scan direction; therefore, the stereoscopic image recorded with the apparatus 80 has high quality, producing a satisfactory three-dimensional depth.

In the embodiment described above, the slow scan direction in which the lenticular recording material F is transported for recording the linear images of the respective original images is limited to y-direction; however, this is not the sole case of the present invention and, if desired, the slow scan direction for the recording of the linear images of one original image may be opposite to the slow scan direction for the recording of the linear images of another original image; for instance, the linear images of original image a are recorded as the lenticular recording material F is transported in the direction of arrow y and, thereafter, the linear images of original b are recorded as the material F is transported in the opposite direction. In this case, the order in which the linear images of original b are recorded is reversed from the order for the previous case ($b_1, b_2, \ldots$).

The angle at which the light beam L for recording the linear images of the respective original images is launched into the lenticular sheet C may be determined as appropriate in consideration of various factors, such as the curvature of lenticular lenses on the lenticular sheet C, the positions at which the linear images are to be recorded, the line widths of the linear images and the conditions for shooting the original images, in order to insure that the linear images of the respective original images will be recorded equally on the recording layer D beneath each lenticular lens.

The drive unit for the scanning optics 84 is not limited in any particular way and any known drive means may be adopted; to give just one example, the scanning optics is caused to run as energized by a variety of drive sources such as a motor, especially a drive source such as a pulsing motor.

The means of moving the scanning optics 84 for adjusting the angle of incidence of the light beam L on the lenticular sheet C is in no way limited to the method shown in FIG. 14 and any of the means that are capable of adjusting the angle of incidence of light beam L on the lenticular sheet C while maintaining the optical path length of the light beam can be used; examples of such methods include moving the scanning optics 84 by a link mechanism, as well as the use of arms or the like that will rotate the scanning optics 84 as in the case shown in FIG. 14.

The means of adjusting the angle of incidence of the light beam L on the lenticular sheet C also is in no way limited to the illustrated case of moving the scanning optics and the intended purpose can also be attained with the scanning optics 84 being fixed. Examples of such approach include adjusting the angle of incidence and optical path length (focusing position) of the light beam L, as well as changing the angle of lenticular recording material F with respect to the light beam L. If desired, a plurality of scanning optics 84 may be provided, with linear images of different original images being recorded with different scanning optics.

With the illustrated recording apparatus which relies upon front exposure, the means of adjusting the width of linear images to be recorded for each original image is in no way limited to the optical approach using a cylindrical lens or the like and, as in the case of the recording apparatus 70, an image processing approach may be taken using the linear image processing unit 86. If desired, the two approaches may be combined to adjust the width of linear images for each original image.

In the absence of optical members, the angle of light beam incident on the lenticular recording material F (lenticular sheet C) may be adjusted by a suitable method such as adjusting the position of the scanning optics 84 or changing the angle of the lenticular recording material, and scanning is repeated as many times as required to insure that the width of scan line defined by the light beam is increased in the slow scan direction.

As with the recording apparatus 70, it is preferred for the recording apparatus 80 to perform the recording of linear images with care being taken to insure that the direction of the generatrix of the lenticular sheet C is in agreement with the fast scan direction and this can be accomplished by adjusting various factors such as the direction of fast scanning with the light beam, the transport of the lenticular recording material F and image recording with the light beam L.

In the second and fifth aspects of the present invention described above, the lenticular recording material F which has been subjected to image recording either from the front side or from the rear side is then subjected to a development process that suits the specific type of the recording layer D (light-sensitive layer), whereby a stereoscopic image is produced using the lenticular sheet C.

As described above in detail, according to the second and fifth aspects of the present invention for recording a stereoscopic image composed of linear images on a lenticular recording material by scanning exposure, the width in the slow scan direction of the linear images of each original image to be recorded within one pitch of lenticular lenses in the lenticular recording material is adjusted in an advantageous manner to enable the recording of a stereoscopic image with the line width increased satisfactorily. As a result, stereoscopic images can be recorded in such a way that they will insure satisfactory stereoscopic vision at all times independently of external factors such as the position of viewer's eye.

What is more, image information on the original images is processed and the light beam modulated in accordance with the processed image information is used to perform scanning exposure for recording a stereoscopic image. Hence, the optics of the apparatus for recording a stereoscopic image according to the present invention features a simple construction. Furthermore, one can alter the distance between linear images to be recorded and even their density by electrical processing of image information and a simple adjustment of the optics and it is also easy to alter or adjust the image recording regions, image density, etc. As a result, there is insured great flexibility in adaptation for the adjustment of the number of original images to be recorded, the performance of various image processing operations such as changing the magnification of image to be recorded and correction of shading, alterations in the specifications of the lenticular sheet, and the change in the size of image to be recorded.

A method of recording a stereoscopic image according to the third aspect of the present invention, as well as an apparatus for recording a stereoscopic image according to the sixth aspect of the invention are described below in detail with reference to FIGS. 17–23. According to the third and sixth aspects of the present invention, a lenticular recording material having a recording layer formed on the rear surface of a lenticular sheet, or a lenticular recording material that is prepared by bonding a lenticular sheet to a recording material after image has been recorded on the latter, is subjected to scanning exposure, either from the rear side (where the recording layer is present) or from the front side, with a light beam modulated in accordance with the linear images obtained from a plurality of original images, whereby the linear images are recorded on the lenticular recording material to produce a stereoscopic image. Not only the image information on the original images but also the information on the principal objects of the original images are obtained and each original image is split into linear images, the sequence of which is determined in such a way that the principal objects of the respective original images will coincide with one another on the recorded stereoscopic image, and the linear images of the original images are recorded in accordance with the thus determined sequence.

In the recording method and apparatus according to the third and sixth aspects of the present invention, image information is obtained by a suitable technique such as reading the original images with a CCD camera etc. or receiving original image information from a source of image information (e.g. computer); at the same time, information on the principal objects of the original images is obtained by a suitable technique such as designating, with a mouse or the like, a certain location on each of the original images represented on a display, setting a desired location with a digitizer or the like, or receiving the relevant information together with the information on the original images.

On the basis of the image information on the original images thus obtained, each original image is split into linear images that are formed as image signals to be recorded on the lenticular recording material. Thereafter, the linear images are arranged to determine the positions in which they are to be recorded on the lenticular recording material, thereby producing image information to be recorded. The linear images are sequenced in such a way that the principal objects of the respective original images will coincide with one another. Stated more specifically, the sequencing is made in such a way that those linear images which carry at least the central portion of the principal object of each original image will be recorded within the same pitch of lenticular lenses in the lenticular recording material, thereby producing the image information to be recorded on the lenticular recording material.

The light beam modulated in accordance with such image information is used to scan and expose the lenticular recording material, thereby recording a stereoscopic image on it.

Therefore, in accordance with the third and sixth aspects of the present invention, stereoscopic image that features good registration between the principal objects of original images can be recorded by a simple procedure and with a recording apparatus using simplified optics, regardless of the number of original images to be recorded. In short, a stereoscopic image of high quality can be recorded with ease.

What is more, information on a plurality of original images as obtained from different viewpoints is processed and the light beam modulated in accordance with the processed image information is used to perform scanning exposure for recording a stereoscopic image. Hence, unlike the case of optical recording of stereoscopic images which relies upon projection of exposing light, the optics of the apparatus for recording a stereoscopic image according to the present invention features a simple construction. Furthermore, one can alter the distance between linear images to be recorded and even their density by electrical processing of image information and a simple adjustment of the optics and it is also easy to alter or adjust the image recording regions, image density, etc. As a result, there is insured great flexibility in adaptation for the adjustment of the number of original images to be recorded, the performance of various image processing operations such as changing the magnification of image to be recorded and correction of shading, alterations in the specifications of the lenticular sheet, and the change in the size of image to be recorded.

Therefore, according to the third and sixth aspects of the present invention, there is insured an extremely high operational efficiency and yet, stereoscopic images of high quality that conform to the specifications of the lenticular sheet used, the size of image to be recorded, etc. and which have been subjected to various image processing operations while accomplishing registration in principal objects can be recorded with high degree of freedom.

On the pages that follow, the method of recording a stereoscopic image according to the third aspect of the present invention and the apparatus for recording a stereoscopic image according to the sixth aspect are described in detail with reference to the preferred embodiments shown in accompanying drawings.

Figure 17:
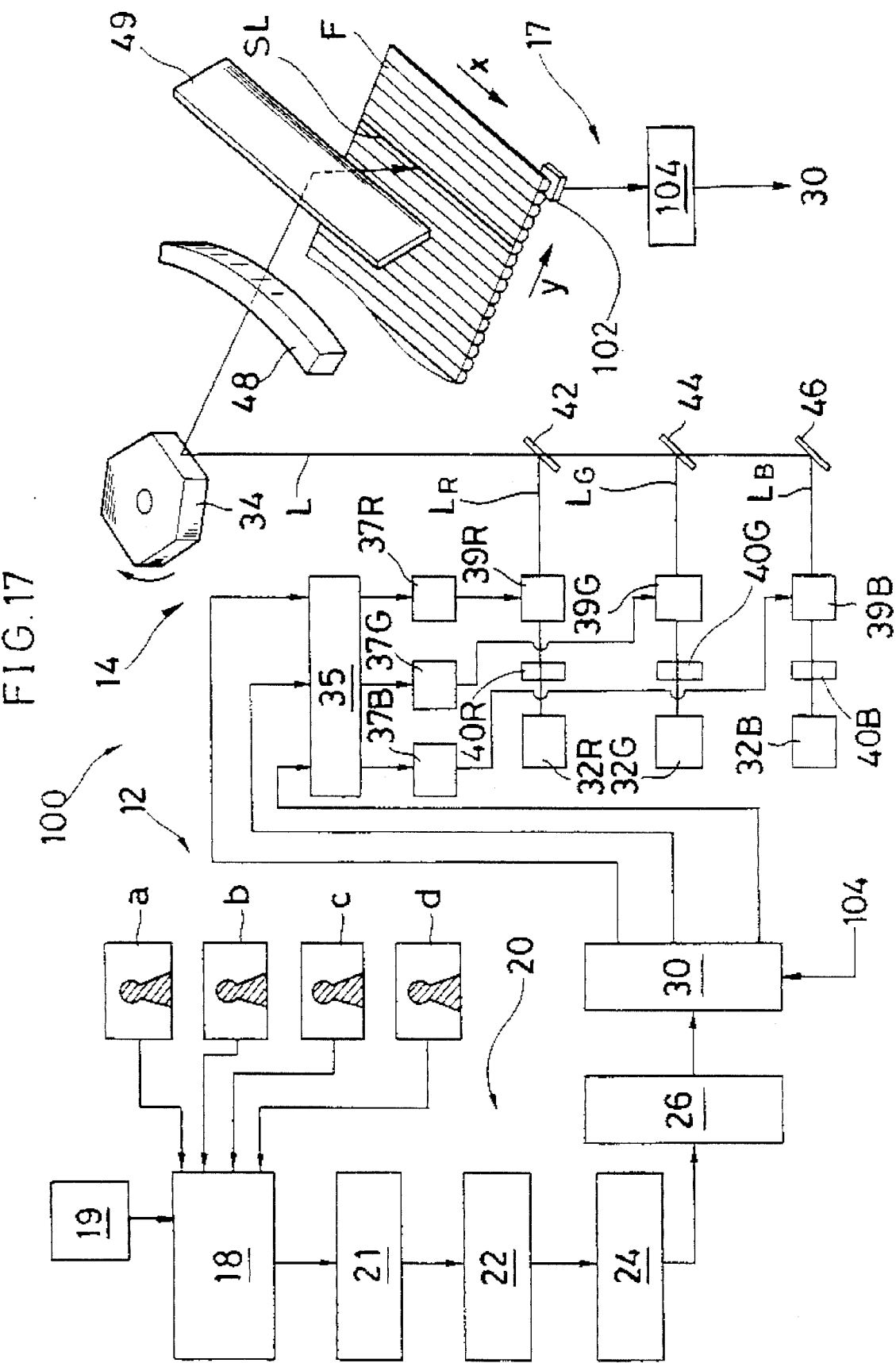
FIG. 17 is a diagram showing conceptually a stereoscopic image recording apparatus according to a further embodiment of the present invention.

FIG. 17 shows conceptually the apparatus for recording a stereoscopic image according to the sixth embodiment of the present invention to implement the method according to the third aspect.

The apparatus for recording a stereoscopic image (which is hereunder referred to simply as the "recording apparatus") generally indicated by 110 in FIG. 17 comprises basically the following components: an image processing means 12 that reads photoelectrically a plurality of original images a–d as obtained from different viewpoints by an imaging device such as a multi-lens camera and which performs image processing on them to output linear image information that permits the completed stereoscopic image to come out correctly when it is viewed from the front side of the lenticular recording material F; and an image forming means 14 that deflects in the fast scan direction (as indicated by arrow x in FIG. 17) a light beam L modulated in accordance with the image information supplied from the image processing means 12, that transports the lenticular recording material F in the slow scan direction (as indicated by arrow y in FIG. 17) which is generally perpendicular to the fast scan direction, and that scans over the lenticular recording material F two-dimensionally by means of the light beam L from the rear side (where the recording layer C is provided) so that a stereoscopic image is recorded through scanning exposure.

The image processing means 12 comprises a reading unit 18 for reading original images a–d and a linear image processing unit 20 with which the image information read by the unit 18 is processed to image information on the linear images to be recorded on the lenticular recording material F. The reading unit 18 is characteristic of the third and sixth aspects under discussion and is furnished with a means of setting principal objects 19.

The recording apparatus 100 shown in FIG. 17 is essentially the same as the recording apparatus 10 shown in FIG. 1 except that the registration means 16 is replaced by a registration means 17 and that the means of setting principal objects 19 is additionally provided. Therefore, the components that are identical to those which are shown in FIG. 1 are identified by like numerals and will not be described in detail.

With the recording apparatus 100 shown in FIG. 17, the means 19 sets the principal objects of original images (as indicated by 28 in FIG. 2) and the linear image processing unit 20 to be described later in this specification determines the sequence of linear images in such a way that the principal objects thus set for the respective original images will coincide with one another on the recorded stereoscopic image.

The means of setting principal objects 19 is in no way limited and any known means of designating images (designating or setting image regions) may be employed. An exemplary method is described below.

First, one original image, say, original image a is represented on a display and by manipulation of a mouse, x-y plotter or the like, a cursor is moved to designate the region of principal object. In a subsequent reading mode, the image pattern and position of the region designated as the principal object of original image a are stored. The stored image pattern and position of the principal object are compared with the positions of the principal objects of other original images b–d (i.e., the positions of similar image patterns) when those original images are read, and the deviations of the positions of the principal objects of original images b–d in both the fast scan direction (x-direction) and the slow scan direction (y-direction) are calculated as $(\Delta x_b, \Delta Y_b)$, $(\Delta x_c, \Delta Y_c)$ and $(\Delta x_d, \Delta Y_d)$. Thus, the positions of the principal objects of the original images to be recorded are set.

The recording positions of the respective original images are determined by the linear image processing unit 20 to be described later in this specification; the recording positions of linear images may be determined in accordance with the calculated deviations of principal objects, namely, $\Delta x$ and $\Delta y$; the registration of principal objects in x-direction may be effected by shifting the recording positions through the processing of image information with the image processor 26 in the linear image processing unit 20 whereas the registration of principal objects in y-direction may be effected by shifting the sequence of linear images with the sequencer 24 in the linear image processing unit 20.

The means of setting principal objects 19 is in no way limited to the case where it is provided on the reading unit 18; if desired, the setting means 19 may be provided in the linear image processing unit 20.

It is not absolutely necessary to provide the setting means 19 in the recording apparatus 100 and the principal objects may be set by automatic judgment with the reading unit 18 or linear image processing unit 20. Alternatively, preset principal objects may be marked on the original images in terms of bar codes or the like, which are read to make a decision about the identity of principal objects.

According to another method, the deviations in the principal objects of the respective original images are calculated for the slow scan direction on the basis of the data collected at the time of shooting the original images and the sequence of linear images as achieved by the sequencer 24 is shifted in accordance with the calculated deviations.

Figure 18:
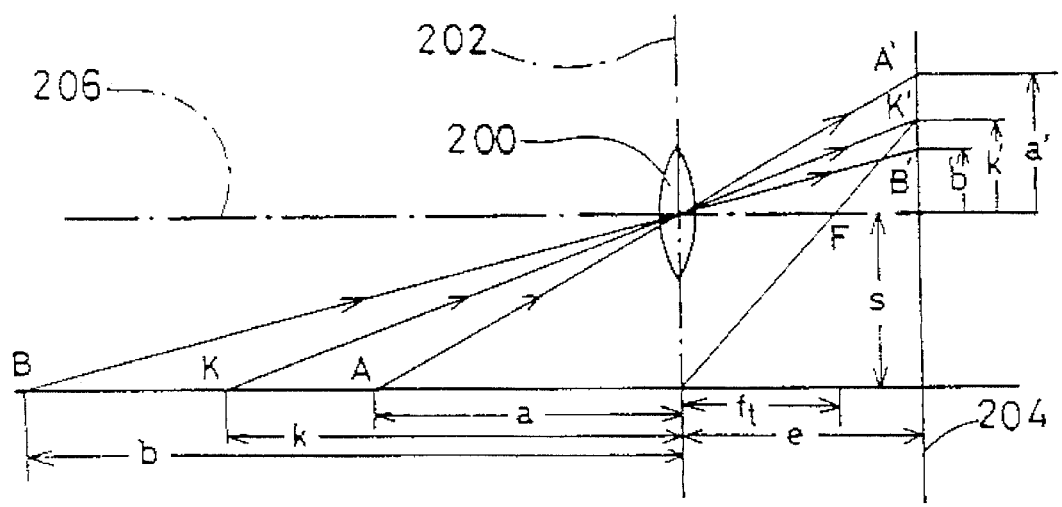
FIG. 18 is a diagram for illustrating conceptually the deviations that develop in the recording position of the object when an original image is shot in stereoscopic photography.

With the original images obtained from different viewpoints, the images of objects at varying positions of depth are recorded at positions offset from the optical axis of the camera lens in accordance with the variation in the object-to-lens distance (see FIG. 18).

The respective amounts of deviation are also related to the distance from the camera lens and may be expressed by the following equations as taught in Japanese Patent Publication (kokoku) No. 7981/1983;

$e = kf/(k-ft)$ $k' = se/k = sft/(k-ft)$ $a' = se/a = (k/a)k'$ $b' = se/b = (k/b)k'$ where ft is the focal length of camera lens 200; a, b and k are the distances to objects A, B and K, respectively, from the center line 202 of the camera lens 200; and a', b' and k' are the distances to images A', B' and K', respectively, from the longitudinal axis 206 as measured parallel to film plane 204.

Thus, on the basis of data for the shooting of original images, the amounts of deviation in the principal objects of the respective original images can be calculated and the principal objects of the respective original images can accordingly be set.

The shooting data comprises distance to principal objects and other data that are measured, upon shooting, by an autofocus or zone-focus mechanism in the means of shooting original images and they may be stored in the original images by either optical or magnetic means. A convenient method may be exemplified by calculating the amounts of deviation in original images as compared to a preliminarily assumed standard object distance.

According to still another method, the principal objects are assumed to be located in the center of image plane; then, the image pattern in the central portion of one original image is compared with the image patterns in the central portions of the other original images to check for any positional offsets of the individual original images as in the method described above and the positions of the principal objects are set on the basis of the thus examined offsets.

The information of original images a–d read by the reading unit 18 is then transferred to the linear image processing unit 20. The linear image processing unit 20 comprises a pre-image processor 21, a splitter 22, a sequencer 24 and an image processor 26. The linear image processing unit 20 first receives at the pre-image processor 21 the information about original images a–d (and the information about the principal objects as well) that are supplied from the reading unit 18. The supplied information is subjected to various image processing operations in the pre-image processor 21. The processed original image information is sent to the splitter 22, where it is split into a plurality of linear images that are to be recorded on the lenticular recording material.

The information on the linear images of the respective original images is then supplied to the sequencer 24, where the positions in which the linear images are to be recorded on the lenticular recording material F are determined in such a way that the completed stereoscopic image will come out correctly when it is viewed from the front side of the recording material F and they are arranged in the order of recording.

The linear images are sequenced in such a way that the principal objects of the respective original images as set by the means 19 will coincide with one another on the recorded stereoscopic image.

Consider, for example, the case where, given a pitch (P) of 0.1 mm, the principal object 28 of original image a as set by the means 19 is carried by linear images $a_{400}$–$a_{600}$, the principal object of original image b as set by the means 19 is carried by linear images $b_{398}$–$b_{598}$, the principal object of original image c as set by the means 19 is carried by linear images $c_{397}$–$c_{597}$, and the principal object of original image d as set by the means 19 is carried by linear images $d_{396}$–$d_{596}$.

In order to achieve satisfactory registration of the principal objects, the linear images carrying the same portion of the principal objects of the respective original images must be recorded within the same pitch; hence, linear images $a_{400}$, $b_{398}$, $c_{397}$ and $d_{396}$ must be recorded within the same pitch, and so must be the other three sets of linear images, $a_{401}/b_{399}/c_{398}/d_{397}$, $a_{402}/b_{400}/c_{399}/d_{398}$, and $a_{600}/b_{598}/c_{597}/d_{596}$.

Figure 19:
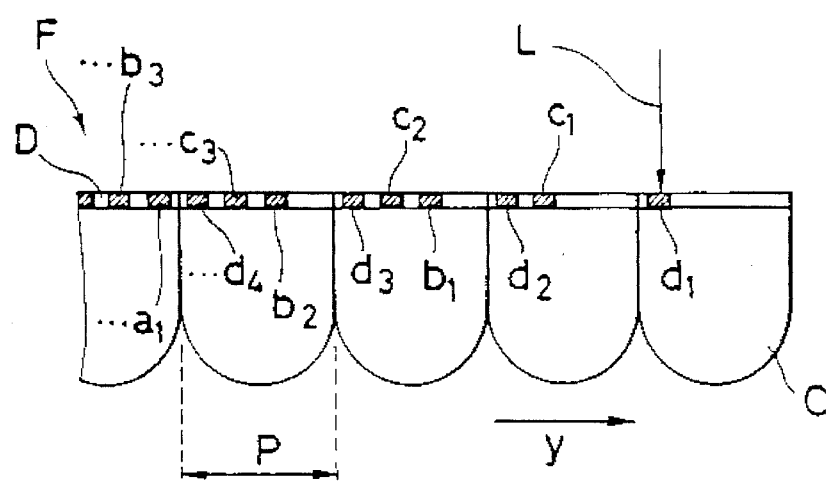
FIG. 19 is a diagram showing conceptually how linear images are recorded on a lenticular recording material with the stereoscopic image recording apparatus shown in FIG. 17.

Therefore, the linear images of the respective original images have to be sequenced in accordance with the above-described registration of principal objects and the recording positions (sequence) of the individual linear images are determined in such a way that they will be recorded as shown in FIG. 19, i.e., the linear images of original image d are recorded sequentially in corresponding positions that start with the first pitch as counted in the slow scan direction (y-direction), the linear images of original image c are recorded sequentially in corresponding positions that start with the second pitch, the linear images of original image b are recorded sequentially in corresponding positions that start with the third pitch, and the linear images of original image a are recorded sequentially in corresponding positions that start with the fifth pitch.

If the principal objects of the respective original images are carried by different numbers of linear images, the recording positions (sequence) of the linear images need be determined in such a way that at least those linear images which carry the central portions of the respective principal objects are recorded within the same pitch.

The information on the linear images of original images that have been arranged in the predetermined order is then sent to the image processor 26, where it is processed in accordance with the preset recording conditions, etc. to produce image information to be recorded on the lenticular recording material F, which is forwarded to the image forming means 14.

The image forming means 14 has a light beam issuing means by which the light beams LR, LG and LB modulated in accordance with the linear image information transferred from the linear image processing unit 20 are merged into a single beam for issuing, and a light beam scanning means by which the lenticular recording material F is scanned over two-dimensionally with the merged light beam L.

With the recording apparatus 100 shown in FIG. 17, the sequencer 24 in the linear image processing unit 20 determines the recording positions (sequence) of the respective linear images in such a way that they will be recorded on the lenticular recording material F with registry being achieved between the principal objects 28 of the respective original images and, hence, a satisfactory stereoscopic image can be recorded as accompanied by good registry in the principal objects.

For recording a satisfactory stereoscopic image using a lenticular sheet C, it is important that predetermined linear images (four linear images in the case shown) be recorded correctly within the pitch P of lenticular lenses on the lenticular sheet C.

Furthermore, with the recording apparatus 100 of the present invention, the principal objects of the respective original images are brought into registry by adjusting the sequence of the linear images of the original images; hence, the position where the recording of linear images starts differs from one original image to another and, in the case shown, the start of recording the linear images of original image E delays one pitch, the start of the linear images of original image b delays two pitches, and the start of recording the linear images of original image a delays four pitches, with respect to the recording of the linear images of original image d.

Under the circumstances, the recording apparatus according to the sixth aspect of the present invention has preferably a means of achieving registry in the recording of images on the lenticular recording material F and, to this end, the recording apparatus 100 shown in FIG. 17 is equipped with the registration means 17 that detects a position marker provided on the lenticular recording material F and which allows images to be recorded in agreement with the detection of that position marker. In the case of the illustrated recording apparatus 100, the registration means 17 is composed of a detection means 102, which detects the position marker provided under the lenticular recording material F at a downstream end in the fast scan direction, and a recording position control circuit 104 which is connected to the detection means 102. The recording position control circuit 104 is also connected to the exposure control circuit 30.

With the recording apparatus 100, the detection means 102 in the registration means 17 detects the position marker on the lenticular recording material F. In response to a position marker detection signal from the detection means 102, the recording position control circuit 104 senses that the lenticular recording material F has been transported to a predetermined position, and it sends the relevant signal to the exposure control circuit 30.

In response to this signal, the exposure control circuit 30 causes AOMs 39 to modulate the respective light beams so that the linear images of the respective original images will be recorded by the light beam L in the predetermined positions.

Registration of the image recording positions may be performed only at the time of starting the recording process; alternatively, detection by a suitable method such as light detection may be performed either periodically or continuously and the result of detection is fed back to achieve periodic or continuous registration of the image recording positions.

The position marker to be provided on the lenticular recording material F is not limited in any particular way and various forms of marker may be used, as exemplified by sprocket holes, notches, recesses, ridges and projections. The position marker may be formed at any sites other than the image recording regions of the lenticular recording material but which are detectable prior to the start of image recording. As long as this condition is met, the position marker may be provided at the leading end in the slow scan direction or in the neighborhood of a lateral side of the lenticular recording material. A plurality of position markers may be provided and they may be formed periodically.

The detection means 102 will detect the position marker by various methods that suit the shape and other properties of the marker. To name just a few examples of the applicable methods, the marker can be detected by a mechanical means such as contact, an optical means of detecting the change in optical parameters such as light reflectance and transmittance, or by pneumatic sensing.

If desired, a magnet may be used as the position marker for the lenticular recording material and registration may be achieved by detecting the magnet.

The registration means to be used in the recording apparatus of the present invention is in no way limited to the illustrated case of detecting the position marker provided on the lenticular recording material and the same result may be attained by detecting the ridges and grooves in the surface of the lenticular sheet C. Examples of advantageous methods that use this principle include an optical approach which, like the registration means 16 shown in FIG. 1, provides a light-emitting device and a light-receiving device in registration with the sequence of ridges and grooves in the lenticular sheet C and which accomplishes registration in the recording positions by sensing the change that occurs in the quantity of detection light from the light-emitting device when it passes between the two devices, as well as an approach that detects the ridges and grooves in the lenticular sheet by either the mechanical or pneumatic means already described above.

Another advantageous method for achieving registration in image recording is to detect the position of the lenticular recording material F with a suitable device such as encoders that may be provided on the transport rollers, etc. for the recording material F.

Figure 20:
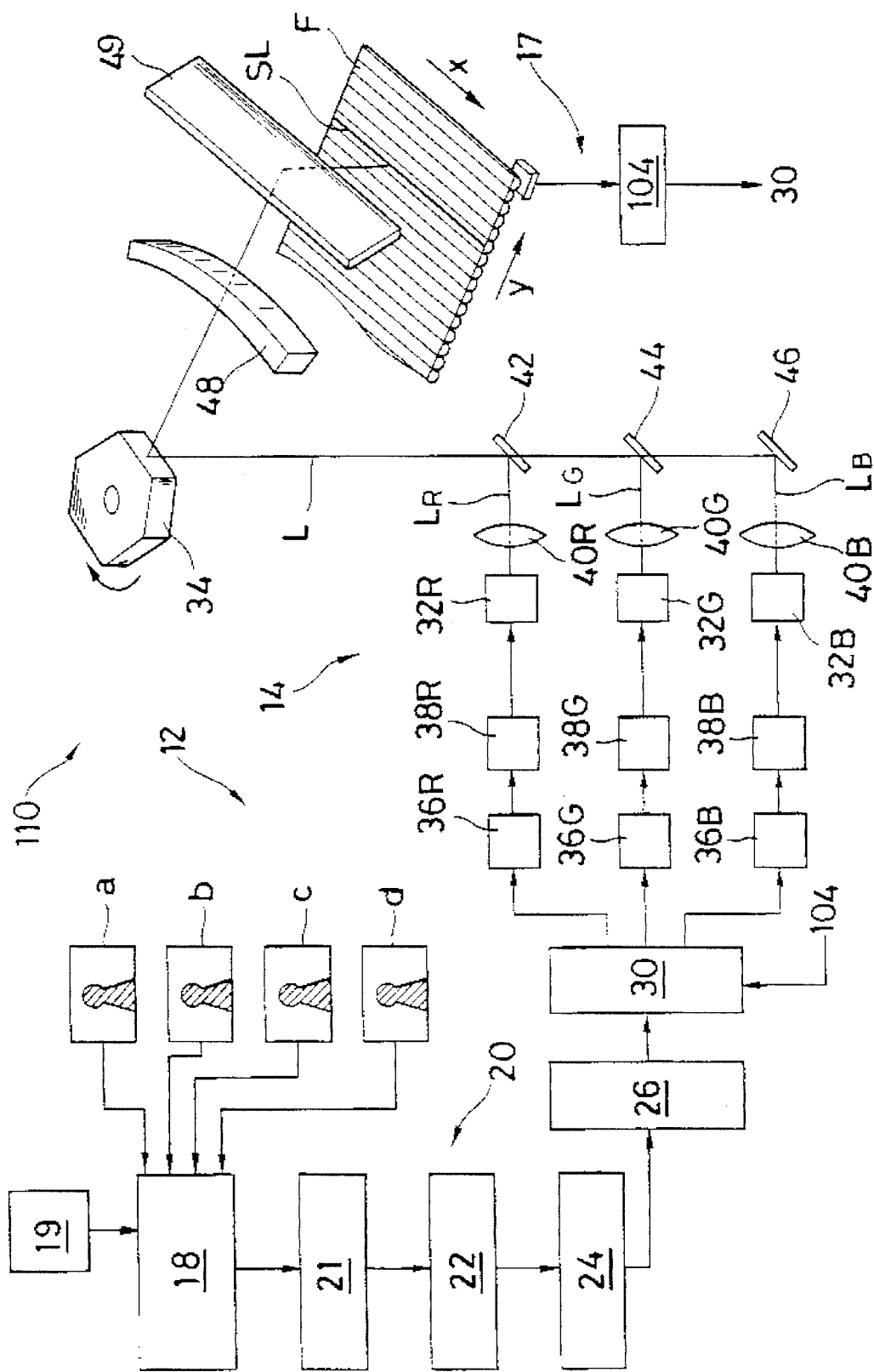
FIG. 20 is a diagram showing conceptually a stereoscopic image recording apparatus according to another embodiment of the present invention.
Figure 21:
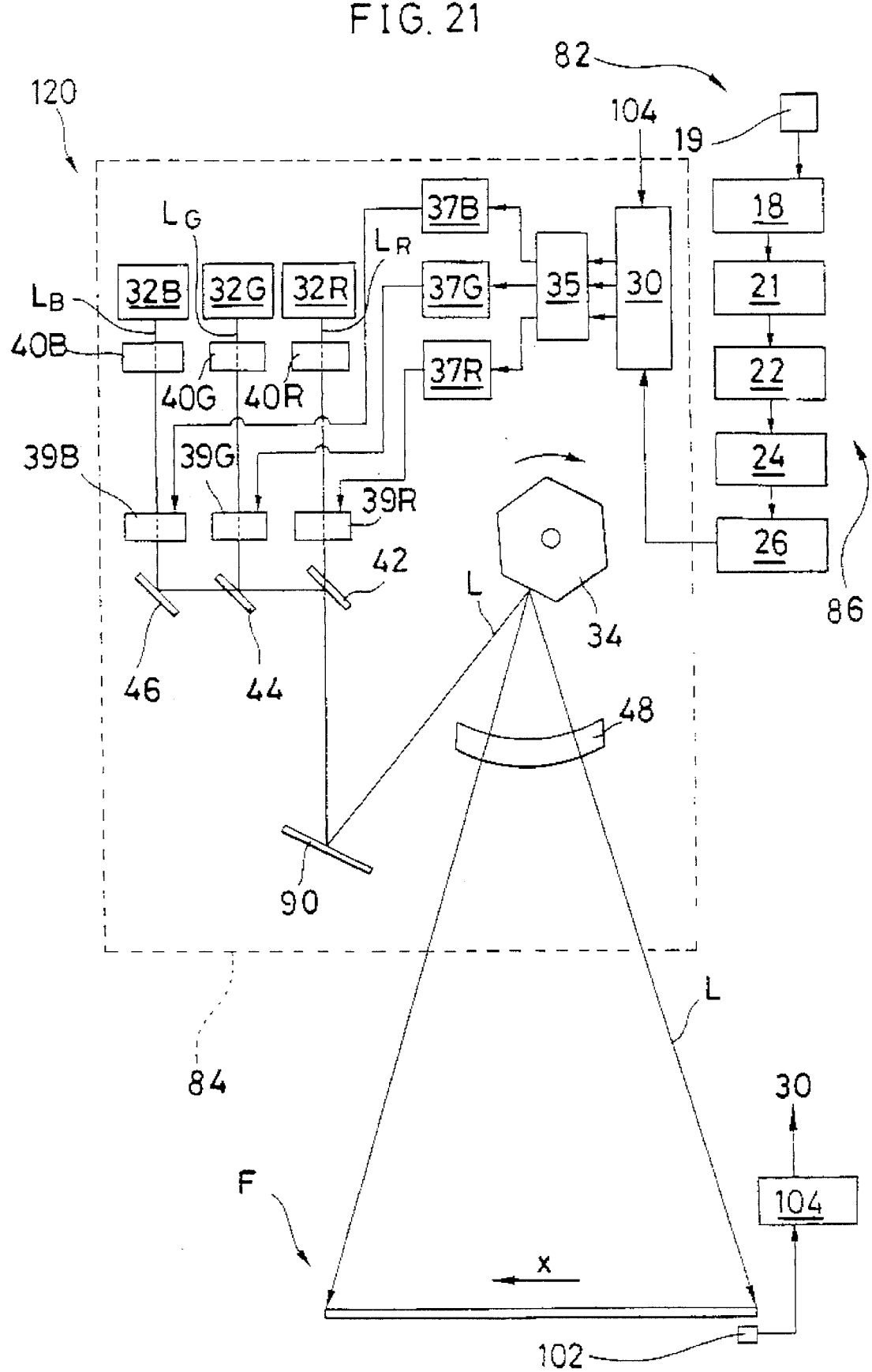
FIG. 21 is a diagram showing conceptually a stereoscopic image recording apparatus, as seen in the slow scanning direction, according to yet another embodiment of the present invention.
Figure 22:
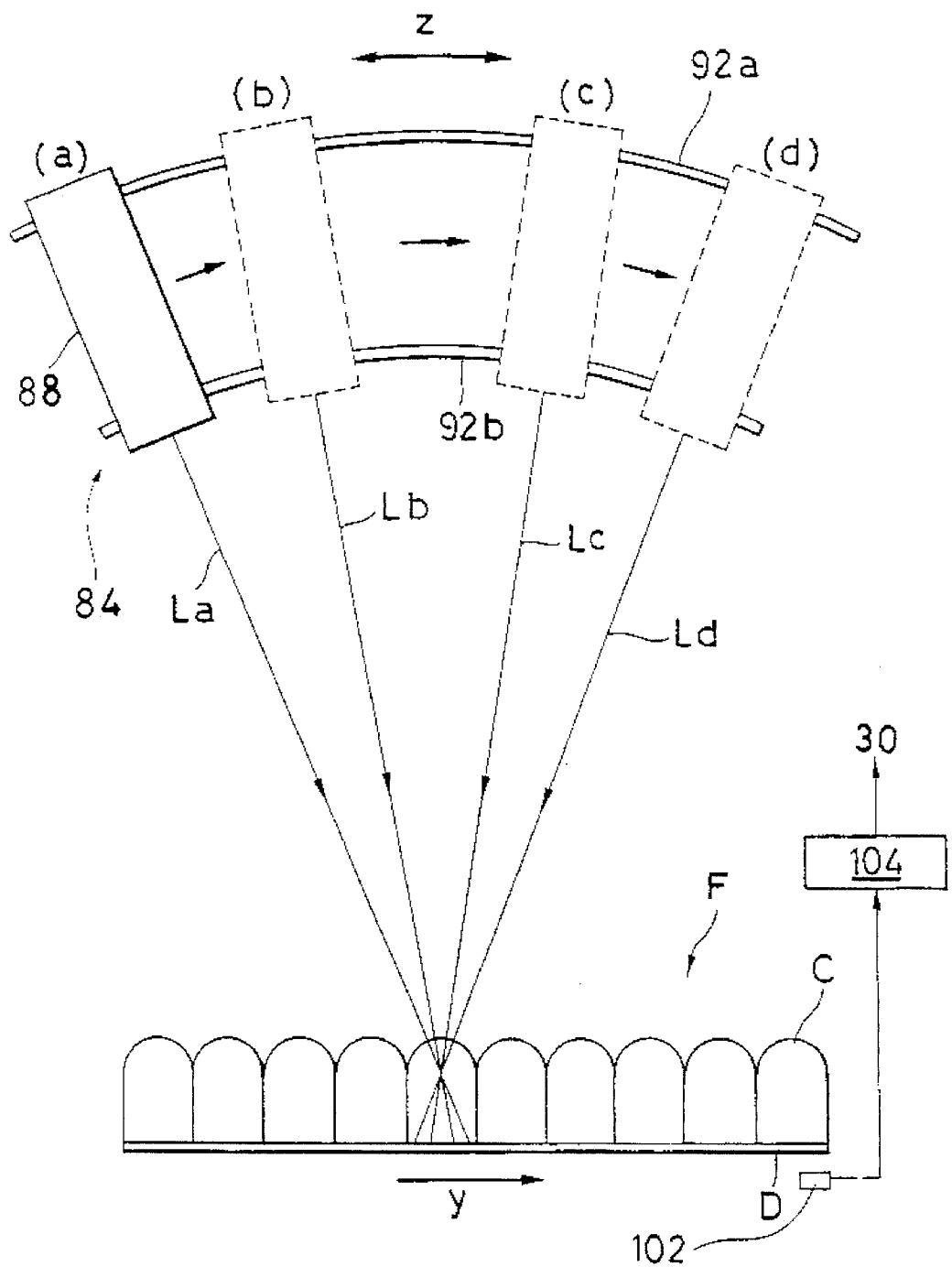
FIG. 22 is a diagram showing conceptually the stereoscopic image recording apparatus, as seen in the fast scanning direction, that is shown in FIG. 21.
Figure 23:
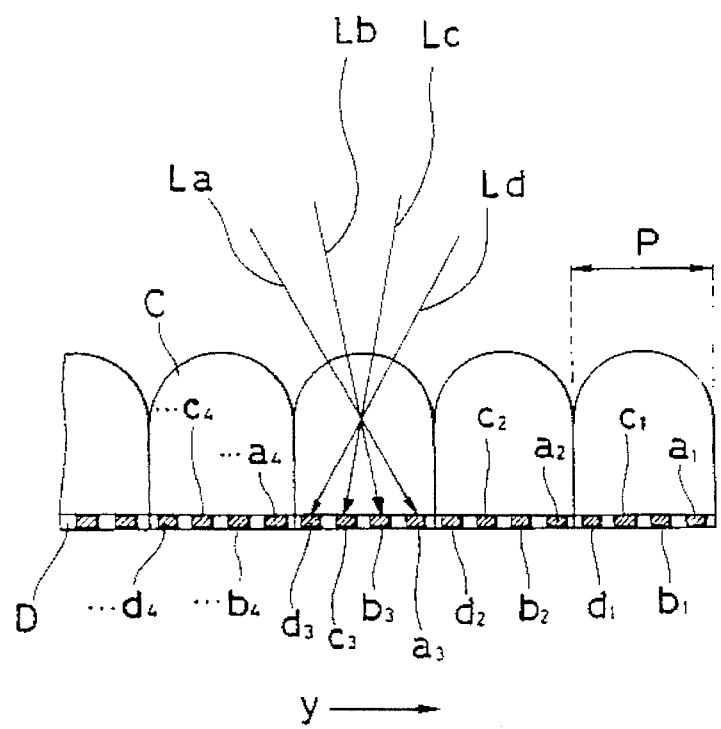
FIG. 23 is a diagram showing conceptually how linear images are recorded on a lenticular recording material with the stereoscopic image recording apparatus shown in FIG. 21.

According to the third and sixth aspects as well as the other aspects of the present invention, various methods may be adopted for modulating the beam of exposing light and for effecting exposure; for example, the emission from the light sources 32 may be pulse width modulated as in the case of recording apparatus shown by 110 in FIG. 20; or linear images may be recorded on the lenticular recording material from the front side with the exposing light passing through the lenticular sheet C as in the case of recording apparatus indicated by 120 in FIG. 21 and the method of recording a stereoscopic image with that apparatus (see FIGS. 22 and 23). The recording apparatus 110 shown in FIG. 20 is identical to the recording apparatus 100 shown in FIG. 17 except that the light beam issuing means in the image forming means 14 is replaced by the light beam issuing means used in the recording apparatus 11 shown in FIG. 4; hence, the recording apparatus 110 will not be described in detail. The recording apparatus 120 shown in FIG. 21 and the method of recording a stereoscopic image shown in FIGS. 22 and 23 are identical to the recording apparatus 80 shown in FIG. 14 and the method of recording a stereoscopic image shown in FIGS. 15 and 16 except that the cylindrical lens 74 as a means of increasing the recording width of linear images is replaced by the registration means 17 and the principal object setting means 19 used in the recording apparatus 100 shown in FIG. 17; hence, the recording apparatus 120 and the method of recording a stereoscopic image using that apparatus will not be described in detail.

Like the recording apparatus 100, the recording apparatus 120 shown in FIG. 21 has the means 19 provided in the reading unit 18 for setting the principal objects of the respective original images. The sequencer 24 in the linear image processing unit determines (sequences) the recording positions of linear images in such a way that the principal objects of original images as set by the means 19 will coincide with one another on the recorded stereoscopic image.

As shown in FIGS. 21 and 22, a detection means 102 for detecting the position marker provided on the lenticular recording material F is provided beneath the transport path of the lenticular recording material F. The detection means 102 combines with a recording position control circuit 104 to form the registration means 17. The control circuit 104 is connected to the detection means 102 and transfers the detection signal to the exposure control circuit 30 as a signal for achieving registration in image recording.

As described above in detail, the recording apparatus according to the third aspect of the present invention and the method of recording a stereoscopic image according to the sixth aspect perform the recording of a stereoscopic image with the principal objects of original images being brought into exact registry by insuring that at least the central portions of the linear images that carry the same area of the principal objects of the original images are recorded within the same pitch of lenticular lenses on the lenticular recording material. Hence, a stereoscopic image of high quality that features good registration between the principal objects of original images can be recorded by a simple procedure and with a simple apparatus.

What is more, information on the original images is processed and the light beam modulated in accordance with the processed image information is used to perform scanning exposure for recording a stereoscopic image. Hence, the optics of the apparatus for recording a stereoscopic image according to the present invention features a simple construction. Furthermore, one can alter the distance between linear images to be recorded and even their density as well by electrical processing of image information and a simple adjustment of the optics and it is also easy to alter or adjust the image recording regions, image density, etc. As a result, there is insured great flexibility in adaptation for the adjustment of the number of original images to be recorded, the performance of various image processing operations such as changing the magnification of image to be recorded and correction of shading, alterations in the specifications of the lenticular sheet, and the change in the size of image to be recorded.

What is claimed is:

1. A method for recording stereoscopic images, which records a plurality of original images from different viewpoints, on a lenticular recording material having a recording layer provided on the rear side of a lenticular sheet having lenticular lenses, comprising the steps of:

generating image information corresponding to said plurality of original images, forming discrete linear images into which each of the original images is split and that correspond to respective lenticular lenses on said lenticular sheet and to the pitch of the lenticular lenses, determining, in accordance with the conditions for recording the original images, the positions where the linear images based on said original images are to be recorded on said images recording layer in such a way that a completed stereoscopic image will come out correctly when it is viewed from the lenticular sheet side, and recording said linear images from the rear side of said lenticular recording material, wherein said lenticular recording material is scan exposed two-dimensionally from the rear side with a light beam modulated in accordance with said linear images to be recorded and said linear images are recorded as they are arranged sequentially in accordance with the conditions for recording the original images, thereby forming a complete stereoscopic image which is viewable from the lenticular sheet side.

2. The method for recording stereoscopic images according to claim 1, wherein the step of recording said linear images includes:

preventing halation of said linear images by providing an anti-halation layer between said recording material and said lenticular sheet.

3. The method for recording stereoscopic images according to claim 1, wherein the step of recording said linear images includes:

adjusting a recording width of the linear images such that no gaps exists on the recording material between adjacent linear images.

4. The method for recording stereoscopic images according to claim 3, wherein the step of recording said linear images includes:

using a beam expander to increase the recording width of the linear images.

5. The method for recording stereoscopic images according to claim 1, wherein the step of recording said linear images includes:

for each of said lenticular lenses, recording a plurality of each of said linear images that correspond to the pitch of said lenticular lenses, such that no gaps exist on the recording material between adjacent linear images.

6. The method for recording stereoscopic images according to claim 1, further comprising the steps of:

continuously transporting said lenticular recording material in a slow scan direction at a slow scan speed, scan exposing said lenticular recording material in a fast scan direct at a fast scan speed with a series of scan lines, said fast scan direction being generally perpendicular to said slow scan direction;

calculating an angle of deviation of the scan lines based on a relationship between the slow and fast scan speeds;

correcting the fast scan direction by the angle of deviation such that each of said scan lines coincides with a direction of a generatrix of the lenticular recording material.

7. A method according to claim 1, wherein said linear images are represented on a display as they are sequenced in accordance with the conditions for recording the original images in such a way that a completed stereoscopic image will come out correctly when it is viewed from the lenticular sheet side and the displayed images are recorded on the rear side of said lenticular recording material.

8. A method for recording stereoscopic images, by which a plurality of original images from different viewpoints are recorded on a lenticular recording material having a recording material provided on the rear side of a lenticular sheet, comprising the step of:

obtaining image information on said plurality of original images and information on the principal objects of the original images, splitting each original image into linear images that correspond to respective lenticular lenses and the pitch of the lenticular lenses, determining the positions in which the linear images are to be recorded on said recording layer in such a way that a completed stereoscopic image will come out correctly when it is viewed from the lenticular sheet side and that those linear images which carry at least the central portions of the principal objects of the original images are recorded within the same pitch of lenticular lenses in the lenticular recording material, thereby outputting image information that is to be recorded on said lenticular recording material, and scan exposing said lenticular recording material with the light beam modulated in accordance with said output image information, thereby recording a stereoscopic image.

9. The method for recording stereoscopic images according to claim 8, wherein said scan exposing step includes:

preventing halation of said linear images by providing an anti-halation layer between said recording material and said lenticular sheet.

10. The method for recording stereoscopic images according to claim 8, wherein said scan exposing step includes scan exposing said lenticular recording material in a fast scan direction at a fast scan speed with a series of scan lines, said method further comprising the steps of:

continuously transporting said lenticular recording material in a slow scan direction at a slow scan speed, said slow scan direction being generally perpendicular to said fast scan direction;

calculating an angle of deviation of the scan lines based on a relationship between the slow and fast scan speeds;

correcting the fast scan direction by the angle of deviation such that each of said scan lines coincides with a direction of a generatrix of the lenticular recording material.

11. The method for recording stereoscopic images according to claim 8, wherein the scan exposing step includes:

adjusting a recording width of the linear images such that no gaps exist on the recording material between adjacent linear images.

12. The method for recording stereoscopic images according to claim 11, wherein the scan exposing step includes:

using a cylindrical lens to increase the recording width of the linear images.

13. The method for recording stereoscopic images according to claim 8, wherein the scan exposing step includes:

adjusting an angle of incidence of the light beam in accordance with a viewpoint of one of said original images;

exposing said lenticular recording material from a front side with the light beam such that the linear images corresponding to one of the original images are sequentially recorded on said lenticular recording material; and repeating said adjusting and exposing steps for each of said original images.

14. A method for recording stereoscopic images, by which linear images as produced from a plurality of original images from different viewpoints are recorded to produce a stereoscopic image on a lenticular recording material having a lenticular sheet and a recording layer, wherein a light beam modulated in accordance with the linear images to be recorded is deflected one-dimensionally in the fast scan direction which is generally parallel to the generatrix of said lenticular sheet while, at the same time, said lenticular recording material and the light beam deflected in said fast scan direction are moved relative to each other in the slow scan direction which is generally perpendicular to said fast scan direction, thereby scan exposing the recording layer of said lenticular recording material with said light beam, the spot diameter in the slow scan direction of the light beam incident on said recording layer and/or the number of times by which the linear images of the same original image are recorded within one pitch are adjusted in accordance with the pitch of lenticular lenses in said lenticular recording material so that the recording width of the linear images is increased in accordance with the pitch of lenticular lenses on said lenticular sheet.

* * * * *